(12) United States Patent
Iwai et al.

(10) Patent No.: US 6,942,249 B2
(45) Date of Patent: Sep. 13, 2005

(54) AIRBAG GAS GENERATOR AND AN AIRBAG APPARATUS

(75) Inventors: Yasunori Iwai, Shijyonawate (JP); Yoshihiro Nakashima, Himeji (JP); Nobuyuki Katsuda, Himeji (JP); Masayuki Yamazaki, Himeji (JP); Shingo Oda, Himeji (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 10/377,690

(22) Filed: Mar. 4, 2003

(65) Prior Publication Data

US 2003/0137139 A1 Jul. 24, 2003

Related U.S. Application Data

(62) Division of application No. 09/209,747, filed on Dec. 11, 1998, now Pat. No. 6,540,256.

(30) Foreign Application Priority Data

| Dec. 26, 1997 | (JP) | 9-360539 |
| Mar. 27, 1998 | (JP) | 10-81643 |
| May 15, 1998 | (JP) | 10-133221 |

(51) Int. Cl.[7] .............................................. B60R 21/28
(52) U.S. Cl. ..................................................... 280/741
(58) Field of Search ............................... 280/741, 740, 280/742, 737

(56) References Cited

U.S. PATENT DOCUMENTS

| 3,811,358 A | 5/1974 | Morse |
| 3,827,715 A | 8/1974 | Lynch |
| 3,829,537 A | 8/1974 | Rosenthal |
| 3,958,949 A | 5/1976 | Plantif et al. |
| 3,986,456 A | 10/1976 | Doin et al. |
| 4,200,615 A | 4/1980 | Hamilton et al. |
| 4,358,998 A | 11/1982 | Schneiter et al. |
| 4,380,346 A | 4/1983 | Davis et al. |
| 4,394,033 A | 7/1983 | Goetz et al. |
| 4,713,127 A | 12/1987 | Müller et al. |
| 4,876,962 A | 10/1989 | Olsson |
| 4,886,293 A | 12/1989 | Weiler et al. |
| 4,890,860 A | 1/1990 | Schneiter |
| 4,911,077 A | 3/1990 | Johansson et al. |
| 4,950,458 A | 8/1990 | Cunningham |
| 4,998,751 A | 3/1991 | Paxton et al. |
| 5,104,466 A | 4/1992 | Allard et al. |
| 5,116,080 A | 5/1992 | Wipasuramonton |
| 5,125,684 A | 6/1992 | Cartwright |
| 5,145,535 A | 9/1992 | Patrick |
| 5,219,178 A | 6/1993 | Kobari et al. |
| 5,236,675 A * | 8/1993 | Swain et al. ................. 422/305 |
| 5,345,875 A | 9/1994 | Anderson |
| 5,466,420 A | 11/1995 | Parker et al. |
| 5,500,060 A | 3/1996 | Holt et al. |

(Continued)

FOREIGN PATENT DOCUMENTS

| DE | 3939258 | 11/1989 |
| DE | 4019677 A1 | 1/1992 |

(Continued)

*Primary Examiner*—Faye M. Fleming
(74) *Attorney, Agent, or Firm*—Birch, Stewart, Kolasch & Birch, LLP

(57) ABSTRACT

An airbag gas generator has a housing having gas discharge ports, an ignition unit provided within the housing for generating a combustion product upon activation thereof, the ignition unit including an igniter having an output pressure of 700 psi or higher at 20° C. atmosphere when said igniter is burned within a hermetically closed cylinder having a volume of 10 cc, and a seal device for closing the gas discharge ports to prevent fluid communication between an inside and outside of the housing before activation of the gas generator, the seal means being ruptured by an inner pressure increased as a result of the generation of the combustion product.

38 Claims, 13 Drawing Sheets

U.S. PATENT DOCUMENTS

| | | |
|---|---|---|
| 5,545,272 A | 8/1996 | Poole et al. |
| 5,551,343 A | 9/1996 | Hock et al. |
| 5,551,725 A | 9/1996 | Ludwig |
| 5,553,889 A | 9/1996 | Hamilton et al. |
| 5,558,366 A | 9/1996 | Fogle, Jr. et al. |
| 5,602,361 A | 2/1997 | Hamilton et al. |
| 5,616,883 A | 4/1997 | Hamilton et al. |
| 5,623,116 A | 4/1997 | Hamilton et al. |
| 5,625,164 A | 4/1997 | McFarland et al. |
| 5,627,337 A | 5/1997 | Hamilton et al. |
| 5,628,528 A | 5/1997 | DeSautelle et al. |
| 5,630,618 A | 5/1997 | Hamilton et al. |
| 5,641,938 A | 6/1997 | Holland et al. |
| 5,643,345 A | 7/1997 | Cox et al. |
| 5,660,412 A | 8/1997 | Renfroe et al. |
| 5,675,102 A | 10/1997 | Hamilton et al. |
| 5,679,915 A | 10/1997 | Hamilton et al. |
| 5,682,013 A | 10/1997 | Smith et al. |
| 5,700,030 A | 12/1997 | Goetz |
| 5,711,546 A | 1/1998 | Hamilton et al. |
| 5,743,556 A | 4/1998 | Lindsey et al. |
| 5,756,929 A | 5/1998 | Lundstrom et al. |
| 5,780,767 A | 7/1998 | Matsuda et al. |
| 5,780,768 A | 7/1998 | Knowlton et al. |
| 5,804,758 A | 9/1998 | Marsaud et al. |
| 5,817,972 A | 10/1998 | Butt et al. |
| 5,821,448 A | 10/1998 | Hamilton et al. |
| 5,834,679 A | 11/1998 | Seeger |
| 5,839,754 A | 11/1998 | Schlüter et al. |
| 5,850,053 A | 12/1998 | Scheffee et al. |
| 5,861,571 A | 1/1999 | Scheffee et al. |
| 5,951,040 A | 9/1999 | McFarland et al. |
| 5,984,352 A | 11/1999 | Green, Jr. et al. |
| 6,033,500 A | 3/2000 | Ito et al. |
| 6,142,515 A | 11/2000 | Mika |
| 6,227,565 B1 | 5/2001 | McFarland et al. |
| 6,257,617 B1 | 7/2001 | McFarland et al. |

FOREIGN PATENT DOCUMENTS

| | | |
|---|---|---|
| DE | 4129541 A1 | 3/1992 |
| DE | 4234276 C1 | 11/1993 |
| DE | 4318883 | 12/1993 |
| DE | 19520847 A1 | 12/1996 |
| DE | 19725452 | 12/1998 |
| DE | 10006522 A1 | 9/2000 |
| EP | 0012627 A | 6/1980 |
| EP | 0382552 A | 8/1990 |
| EP | 0404572 A2 | 12/1990 |
| EP | 0449506 | 10/1991 |
| EP | 0586060 A2 | 3/1994 |
| EP | 0504408 B1 | 9/1995 |
| EP | 0673809 A1 | 9/1995 |
| EP | 0742125 A | 11/1996 |
| EP | 0759383 | 2/1997 |
| EP | 0776796 A2 | 6/1997 |
| EP | 0783997 | 7/1997 |
| EP | 0800964 A2 | 10/1997 |
| EP | 0820971 A2 | 1/1998 |
| EP | 0867347 | 9/1998 |
| GB | 2289029 A | 11/1995 |
| JP | 50-146039 A | 11/1975 |
| JP | 51-60332 U | 5/1976 |
| JP | 55-083639 A | 6/1980 |
| JP | 64-006156 B2 | 2/1989 |
| JP | 64-006157 B2 | 2/1989 |
| JP | 3-208878 A | 9/1991 |
| JP | 4-78639 A | 3/1992 |
| JP | 4-87859 A | 3/1992 |
| JP | 4-265292 A | 9/1992 |
| JP | 5-254977 A | 10/1993 |
| JP | 6-107109 A | 4/1994 |
| JP | 6-057629 B2 | 8/1994 |
| JP | 6-239683 A | 8/1994 |
| JP | 7-005981 U | 1/1995 |
| JP | 7-009941 A | 1/1995 |
| JP | 7-061885 A | 3/1995 |
| JP | 7-251694 A | 10/1995 |
| JP | 8-040178 A | 2/1996 |
| JP | 8-156736 A | 6/1996 |
| JP | 8-156737 A | 6/1996 |
| JP | 8-207696 | 8/1996 |
| JP | 8-231290 A | 9/1996 |
| JP | 8-301061 A | 11/1996 |
| JP | 3035865 U | 1/1997 |
| JP | 9-076870 A | 3/1997 |
| JP | 9-095201 A | 4/1997 |
| JP | 9-207705 A | 8/1997 |
| JP | 10-287197 A | 10/1998 |
| JP | 10-297418 A | 11/1998 |
| WO | 94/14637 | 7/1994 |
| WO | 94/25315 A1 | 11/1994 |
| WO | 96/10494 A1 | 4/1996 |
| WO | 96/30716 A1 | 10/1996 |
| WO | 96/40541 A1 | 12/1996 |
| WO | 97/02160 A1 | 1/1997 |
| WO | 97/05087 A1 | 2/1997 |
| WO | 97/41007 A1 | 11/1997 |

\* cited by examiner ent being accommodated in a housing having a gas discharge ports, wherein an operation performance of the gas generator is adjusted such that a tank pressure measured at 0.25×T milliseconds will be 0.25×P (kPa) or less, where a desired tank maximum pressure in the tank combustion test is P (kPa) and a period of time from the start of rising of the tank pressure to the time when the maximum pressure P (kPa) is reached is T milliseconds. The operation performance described above is further preferably adjusted such that the tank pressure measured at 0.80×T milliseconds will be 0.70×P (kPa) or higher.

AIRBAG GAS GENERATOR AND AN AIRBAG APPARATUS

This application is a divisional of application Ser. No. 09/209,747, filed on Dec. 11, 1998 now U.S. Pat. No. 6,540,256 the entire contents of which are hereby incorporated by reference and for which priority is claimed under 35 U.S.C. §120; and this application claims priority of Application Nos. 9-360539, 10-81643, and 10-133221 filed in Japan on Dec. 26, 1997; Mar. 27, 1998; and May 15, 1998 under 35 U.S.C. §119.

BACKGROUND OF THE INVENTION

1. Field of the Invention

The present invention relates to an airbag gas generator to protect a passenger against impacts and more particularly to an airbag gas generator characterized by its unique operating performances.

2. Description of Related Art

Motor vehicles such as automobiles have an airbag system, which protects a passenger from getting injured or killed. When a vehicle crashes at a high speed, the air bag system rapidly inflates an airbag with a gas to prevent a passenger from hitting against hard or dangerous portions, such as a steering wheel and windshield inside the vehicle, due to inertia.

Such an airbag system should preferably be able to safely hold the passenger, whatever his or her build (which may vary depending on the passenger's sitting height or whether the passenger is an adult or child) or the riding posture (some drivers may cling to a wheel) . To meet this requirement, airbag systems which operate to apply as small an impact as possible to the passenger at the initial stage of activation have conventionally been proposed.

JP-A 8-207696 proposes an airbag system that uses two kinds of gas generating capsules to produce a gas in two stages, with the first stage inflating the bag relatively slowly and the second stage causing a rapid gas generation. This system, however, has a drawback that the structure inside the gas generator is complicated, which in turn increases the size of a container and therefore increases the manufacturing cost.

U.S. Pat. Nos. 4,998,751 and 4,950,458 also propose airbag systems that have two combustion chambers for burning a gas generating agent in two stages to restrict the operating function of the gas generator. These systems, however, are complex in structure and not satisfactory.

SUMMARY OF THE INVENTION

The present invention provides an airbag gas generator which, though simple in construction, operates to apply as small an impact as possible to a passenger in the initial stage of operation and, in a subsequent operation stage, may reliably protect the passenger. For the driver's seat, for example, this invention provides an airbag gas generator that moderates the inflation speed of the airbag during a period of 10 milliseconds from the start of the inflator activation compared with that of the conventional inflator and which, 30–50 milliseconds after the activation, exhibits an operation performance capable of holding the passenger well.

The above objective of this invention may be achieved by an airbag gas generator which comprises: single ignition means activated by an impact; and a gas generating agent ignited and burned by the ignition means to generate a combustion gas, the ignition means and the gas generating agent being accommodated in a housing having a gas discharge ports, wherein an operation performance of the gas generator is adjusted such that a tank pressure measured at 0.25×T milliseconds will be 0.25×P (kPa) or less, where a desired tank maximum pressure in the tank combustion test is P (kPa) and a period of time from the start of rising of the tank pressure to the time when the maximum pressure P (kPa) is reached is T milliseconds. The operation performance described above is further preferably adjusted such that the tank pressure measured at 0.80×T milliseconds will be 0.70×P (kPa) or higher.

In particular, this invention provides an airbag gas generator in which a peak of the combustion maximum internal pressure during the gas generator operation occurs 10–20 milliseconds after an ignition current is supplied.

The peak of the combustion maximum internal pressure in this gas generator during operation should preferably occur 12–16 milliseconds, or more preferably 13–15 milliseconds, after the ignition current is applied. The gas generator of this invention gradually discharges the combustion gas of the gas generating agent from gas discharge ports to moderately increase the pressure of the gas generator and the pressure in the tank until 10–20 milliseconds after the application of the ignition current, at which time the combustion maximum internal pressure peaks. After the pressure in the housing of the gas generator has peaked, the gas in an amount sufficient to hold the passenger is rapidly discharged from the gas discharge ports to lower the internal pressure of the gas generator and at the same time sharply increase the pressure in the tank. As a result, an airbag gas generator is realized, whose operation performance is adjusted such that the tank pressure measured at 0.25×T milliseconds is 0.25×P (kPa) or lower as described above, where a desired tank maximum pressure in the tank combustion test is P (kPa) and a period of time from the start of rising of the tank pressure to the time when the maximum pressure P (kPa) is reached is T milliseconds. With the gas generator of this invention with the above operation performance, the output during the initial stage of operation is limited, so that the airbag (bag body) accommodated in the module may be prevented from rapidly inflating in the initial stage of operation and applying excess impacts to the passenger. On the other hand, if the tank pressure measured at 0.25×T milliseconds is 0.25×P (kPa) or higher, the force with which the bag inflates to break open the module is too strong, making it difficult to produce a desired effect of this invention.

The present invention in particular provides an airbag gas generator comprising: single ignition means activated by an impact; and a gas generating agent ignited and burned by the ignition means to produce a combustion gas, the ignition means and the gas generating agent being accommodated in a housing having gas discharge ports; wherein an operation performance of the gas generator is adjusted such that the tank pressure measured at 0.25×T milliseconds is 0.25×P (kPa) or lower, or more preferably the tank pressure measured at 0.80×T milliseconds is 0.70×P (kPa) or higher, where a desired tank maximum pressure in the tank combustion test is P (kPa) and a period of time from the start of rising of the tank pressure to the time when the maximum pressure P (kPa) is reached is T milliseconds; and wherein the peak of the combustion maximum internal pressure during operation occurs 10–20 milliseconds or preferably 12–16 milliseconds or more preferably 13–15 milliseconds after the application of ignition current.

The tank combustion test in this invention refers to a test performed in a method described in the following.

Tank Combustion Test

An airbag gas generator is fixed in a SUS (stainless steel) tank with an internal volume of 60 liters. After the tank is hermetically closed at a room temperature, the gas generator is connected to an external ignition electric circuit. A pressure transducer installed in the tank is used to measure a change in the increasing pressure for a duration from 0 to 200 milliseconds, with the moment at which the ignition electric circuit switch is turned on (the ignition current is applied) taken as time 0. The measured data is then processed by a computer to generate a tank pressure/time curve (hereinafter referred to as a "tank curve") which is used to evaluate the performance of the gas generating pellets. After the combustion is over, a part of the gas in the tank may be sampled for CO and NOx analysis.

The tank maximum pressure in this invention refers to a maximum pressure in the stainless steel tank during the tank combustion test, and the combustion maximum internal pressure refers to a maximum pressure in the housing when the gas generator is operated.

The airbag gas generator of this invention has a simple construction and operates to apply as small an impact as possible to the passenger during the initial stage of its operation and thereafter rapidly inflate the airbag to reliably protect the passenger.

BRIEF DESCRIPTION OF THE DRAWINGS

FIGS. 15A and 15B are pressure-time curves obtained from a tank combustion test, wherein FIG. 15A represents a change over time of the inner pressure of the housing; and FIG. 15B represents a tank pressure curve;

FIG. 18 is a schematic representation only, and does not infer an arrangement of the ports.

DETAILED DESCRIPTION OF THE INVENTION

Figure 1:
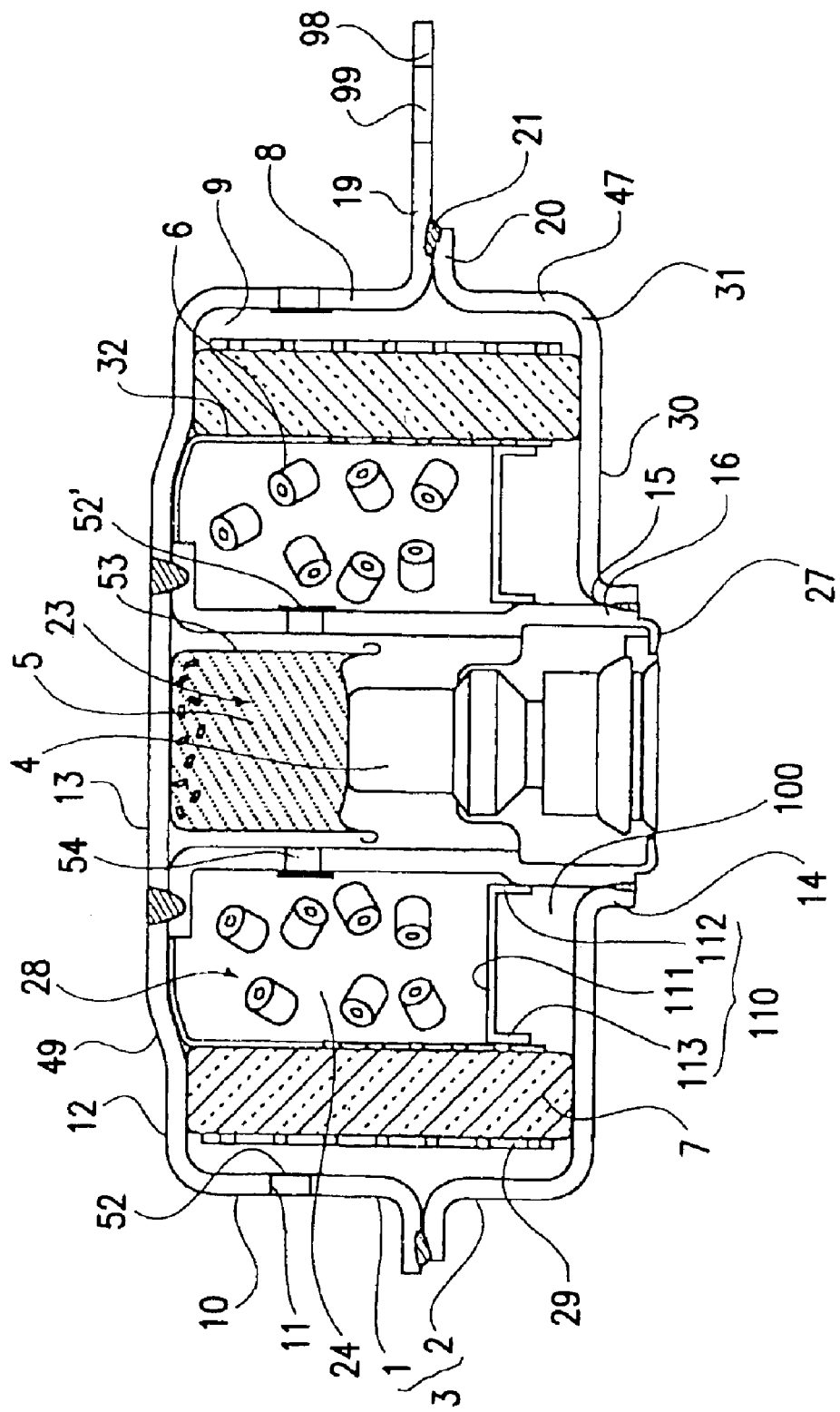
FIG. 1 is a vertical cross section of an embodiment of the gas generator of this invention.

The airbag gas generator of this invention with the above performances can be realized in a variety of embodiments described in the following.

Embodiment 1

A first embodiment of the airbag gas generator of this invention has a combustion chamber in its housing for burning the gas generating agent. The combustion chamber is expanded in volume when the gas generator is activated or the gas generating agent is burned, in order to adjust the timing when the gas generating agent is ignited and burned. A means to expand the volume of such a combustion chamber can be realized by expanding a container shell as a whole, particularly in the axial direction, during the combustion of the gas generating agent to increase the volume of the combustion chamber, or by securing a space portion of a predetermined volume in the combustion chamber which contains no gas generating agent and, during ignition and combustion of the gas generating agent, allowing the gas generating agent's combustion volume to expand into the space portion.

The space portion in the combustion chamber can be secured by, for example, putting the gas generating agent in solid form in either of an upper or a lower part of the combustion chamber or by dividing the interior of the combustion chamber with a partition member. The space portion, because it also functions as a space in which to burn the gas generating agent, needs to have a function of communicating with a gas generating agent accommodating portion and increasing the combustion volume of the gas generating agent at least any one point in time when the gas generating agent is ignited or burned. Hence, when the space portion is formed by dividing the interior of the combustion chamber with the partition member, the partition member will be deformed, displaced, and/or destroyed, or burned by the combustion of the gas generating agent to make the gas generating agent accommodating portion communicate with the space portion.

The partition member that is deformed, displaced, and/or destroyed by the combustion of the gas generating agent may be formed such that the entire partition member will be deformed, displaced, and/or destroyed or only a part of the partition member, such as a pressure receiving surface in contact with the gas generating agent, will be deformed and/or destroyed by the combustion of the gas generating agent. The deformation and/or destruction of the whole or part of the partition member by the combustion of the gas generating agent can also be achieved by forming a weak portion at some location in the partition member (for example, at a pressure receiving portion) which can be deformed and/or destroyed by the burning gas generating agent to provide communication of the gas generating agent accommodating portion with the space portion. When the weak portion is to be provided in the pressure receiving surface, it may be formed by providing a hole or holes in the pressure receiving portion, closing the upper and/or lower part of the hole or holes with a sheet member, and using the part closed by the sheet member as a weak portion. The weak portion can also be formed by providing a groove in the front or back surface of the pressure receiving portion that will break upon combustion of the gas generating agent and by using the grooved portion as the weak portion.

When the displacement of the partition member is utilized to make the gas generating agent accommodating portion communicate with the space portion to increase the gas generating agent combustion volume, the partition member may be arranged to be displaceable into the combustion chamber such that it can be moved (displaced) toward the space portion side by the combustion of the gas generating agent to increase the volume of the gas generating agent accommodating portion.

Further, the partition member may support the gas generating agent with its pressure receiving surface in contact with the material to prevent the gas generating agent from being moved or shattered into pieces by vibrations.

A first embodiment of the airbag gas generator of this invention is shown in FIGS. 1 through 7.

FIG. 1 is a vertical cross section of one embodiment of the airbag gas generator according to this invention.

The gas generator shown in this figure has a housing 3 comprising a diffuser shell 1 and a closure shell 2, the interior of which is divided by an inner cylinder member 16 into two compartments, an ignition means accommodating chamber 23 and a gas generating agent combustion chamber 28. The ignition means accommodating chamber 23 accommodates ignition means triggered by an impact to ignite and burn a gas generating agent 6 (the ignition means including an igniter 4 and a transfer charge 5, in this embodiment). The combustion chamber 28 accommodates the gas generating agent 6 ignited and burned by the ignition means to generate a combustion gas, and an annular partition member 110 that supports the gas generating agent 6, blocks its displacement and divides the interior of the combustion chamber 28 to form a space portion 100 in which no gas generating agent is provided. The diffuser shell 1, which may be formed by casting, forging or pressing, is in this embodiment formed by pressing a stainless steel plate. The diffuser shell 1 includes a circular portion 12, a circumferential wall portion 10 formed along the outer circumference of the circular portion 12, and a flange portion 19 extending radially outwardly from the end of the circumferential wall portion 10. The circumferential wall portion 10 has, in this embodiment, 18 gas discharge ports 11, with a diameter of 3 mm, arranged at equal intervals in the circumferential direction and closed by a seal tape 52. The diffuser shell 1 has a raised circular portion 13 bulging out at the central part of the circular portion 12 by a reinforcement step 49. The reinforcement step 49 gives a stiffness to the diffuser shell circular portion 12 forming the housing 3, particularly its ceiling portion, and also increases the volume of the accommodation space. A transfer charge canister 53 containing the transfer charge 5 is held between the raised circular portion 13 and the igniter 4. The flange portion 19 of the diffuser shell 1 has mounting portions 98 for mounting to mount fittings of a pad module. The mounting portions 9B are arranged 90 degrees apart in the circumferential direction of the flange portion 19 and have mounting holes 99 for screw connection.

The closure shell 2, like the diffuser shell 1, can be formed by casting, forging or pressing and, in this embodiment, is formed by pressing a stainless steel plate. The closure shell 2 has a circular portion 30, a center hole 15 formed at the central part of the circular portion 30, a circumferential wall portion 47 formed along the outer circumference of the circular portion 30, and a flange portion 20 extending radially outwardly from the end of the circumferential wall portion 47. The center hole 15 has an axially bent portion 14 along its edge. The axially bent portion 14 imparts a stiffness to the edge of the center hole 15 and provides a relatively large joint surface with the inner cylinder member 16. The inner cylinder member 16 is fitted in the center hole 15. The housing 3 is formed by stacking and welding together the flange portions 19, 20 of the diffuser shell 1 and the closure shell 2 by laser welding 21 on a horizontal plane crossing an axially near center of the housing 3. These flange portions 19, 20 provide rigidity to the housing, particularly its outer circumferential wall 8, to prevent deformation of the housing due to gas pressure.

In this embodiment, inside the housing is installed the inner cylinder member 16 of almost cylindrical shape, on whose inner side there is the ignition means accommodating chamber 23 and on whose outer side there is the gas generating agent combustion chamber 28. The inner cylinder member 16 can be formed by casting, forging, pressing or cutting, or combination of these. When the inner cylinder member 16 is formed by presswork, for example, a UO press method (which involves forming a plate into a U shape, then forming it into an 0 shape, and welding the seam) or an electric resistance welding method (which involves rolling a plate into a cylinder and impressing a large current while applying a pressure to the seam to weld the seam by resistance heat) may be used. The end of the inner cylinder member 16 on the side accommodating the igniter 4 is formed with a crimping portion 27 that holds the igniter 4 immovably. The circumferential wall of the inner cylinder member 16 has through holes 54 opening into the combustion chamber 28. In this embodiment, six through holes 54, with a diameter of 2.5 mm, are arranged at equal intervals in the circumferential direction and closed by a seal tape 52'. In this embodiment, a coolant/filter 7 installed in the housing for cleaning and cooling the gas produced by the ignition and combustion of the gas generating agent 6 is arranged to enclose the gas generating agent 6 to form an annular chamber around the inner cylinder member 16, i.e., the gas generating agent combustion chamber 28. The coolant/filter 7 is formed by radially stacking plain-woven meshes of stainless steel wire and compressing them radially and axially. The coolant/filter 7 formed in this way has its woven loops of mesh collapsed in each layer and the layers of collapsed mesh loops are stacked in the radial direction. Hence, the coolant/filter 7 has a complex mesh structure and thus offers an excellent particle arresting capability in addition to the function of cooling the generated combustion gas. In this embodiment, on the outer side of the coolant/filter 7 is also formed an outer layer 29 which works as well suppressing means to prevent the coolant/filter 7 from swelling. The outer layer 29 may be formed of a laminated metallic mesh, or a porous cylindrical member having a plurality of through holes in the circumferential wall, or a belt-like swell suppressing layer made by forming a strip of material of a predetermined width into an annular shape. When the outer layer 29 is formed of the laminated metallic mesh, the outer layer 29 can also have a cooling function. The coolant/filter 7 cools the combustion gas generated in the gas generating agent combustion chamber 28 and arrests combustion residue. An inclined portion 31 formed along the circumference of the circular portion 30 of the closure shell 2 prevents the coolant/filter 7 from being displaced and reliably forms a space 9 that functions as a gas passage between the outer circumferential wall 8 of the housing 3 and the coolant/filter 7.

On the inner circumference of the coolant/filter 7 is installed an almost cylindrical perforated basket 32 that protects the coolant/filter 7 against flames of the burning gas generating agent and prevents direct contact between the gas generating agent 6 and the coolant/filter 7.

Electric type ignition means, including the igniter 4 and the transfer charge 5, is installed in the ignition means accommodating chamber 23 defined inside the inner cylinder member 16 in the housing 3.

The gas generating agent combustion chamber 28 formed in the housing outside the inner cylinder member 16 accommodates, in addition to the gas generating agent 6, the partition member 110 that supports the gas generating agent 6 to prevent it from being dislocated and also divides the interior of the gas generating agent combustion chamber 28 into a gas generating agent accommodating portion 24 and a space portion 100 containing no gas generating agent. The gas generating agent combustion chamber 28 thus comprises the gas generating agent accommodating portion. 24 and the space portion 100. The volume ratio of this space portion 100 to the combustion chamber 28 is preferably less than 18%. The space portion 100, at least after the start of the combustion of the gas generating agent, communicates with the gas generating agent accommodating portion 24 to increase the combustion volume of the gas generating agent.

In assembling the gas generator, after the gas generating agent is installed in the gas generating agent accommodating portion 24, the partition member 110 is pushed into the combustion chamber 28 to support the gas generating agent 6. In order to support the installed gas generating agent 6 uniformly, the partition member 110, as shown in FIG. 1, preferably has formed flat its pressure receiving surface 111 that is in contact with the gas generating agent 6, and also preferably has its inner circumference 112 and outer circumference 113 bent in a direction that forms the space portion 100, i.e., toward the closure shell 2. The annular partition member 110, because it evenly supports the accommodated gas generating agent 6, can prevent the gas generating agent from being dislocated thereby eliminating the possibility of the gas generating agent being smashed into pieces by vibrations and changing its surface area.

Figure 2A:
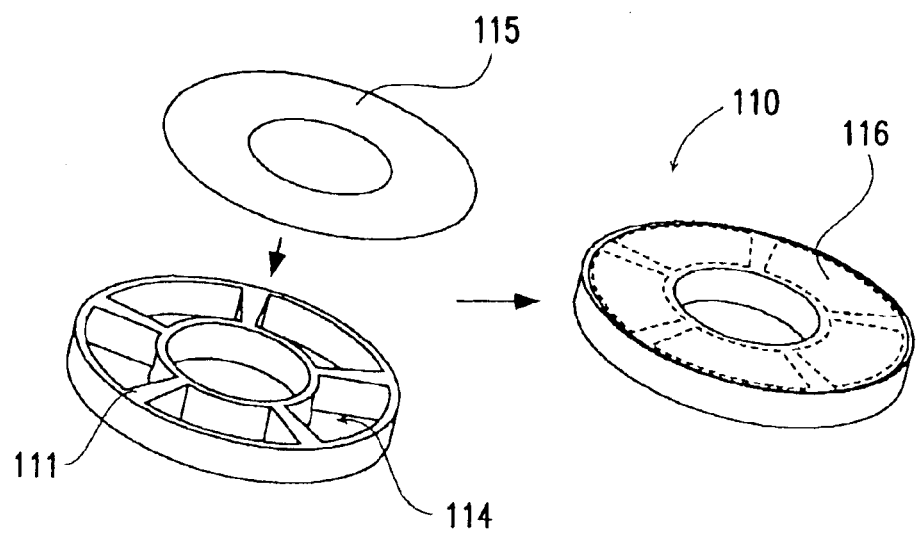
FIGS. 2A and 2B are perspective views of a partition member of FIG. 1.
Figure 2B:
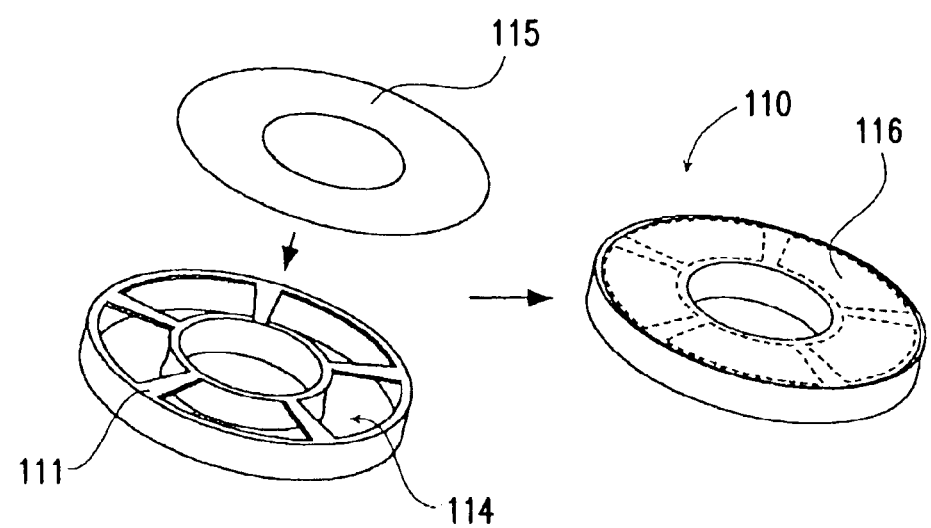
Figure 3:
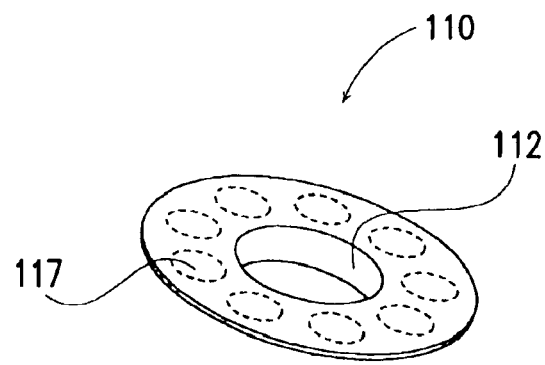
FIG. 3 is a perspective view of another configuration of the partition member.

In addition to the structure shown in FIG. 1, the annular partition member 110 may also have constructions as shown in FIGS. 2A and 2B, in which the contact surface with the gas generating agent, i.e., the pressure receiving surface 111, is formed with holes 114 of an appropriate size that are closed with a sheet member 115 made of metal, plastic or paper which can be ruptured by the pressure of the burning gas generating agent, with the closed portions formed as weak portions 116. FIG. 2A shows a partition member made by casting and FIG. 2B represents a partition member formed by pressing. The partition member made by presswork as in FIG. 2B is advantageous in terms of cost. The weak portions 116 formed in this manner are destroyed (or ruptured) by the combustion of the gas generating agent, making the gas generating agent accommodating portion 24 communicate with the space portion 100 in FIG. 1 to increase the combustion volume of the gas generating agent. The holes 114 can be closed with the sheet member 115 either from above or from below. The sheet member 115 may be pasted on the partition member or inserted between the partition member 110 and the gas generating agent 6. The holes 114 may be formed in the shape of a fan as shown in FIGS. 2A and 2B, or as a number of circular holes 117 as shown in FIG. 3. The partition member shown in FIG. 3 has its inner circumference 112 bent to form a wall that holds the inner cylinder member 16 at a predetermined location in the housing.

The partition member described above, at some point during the combustion of the gas generating agent, has a function of making the gas generating agent accommodating portion 24 communicate with the space portion 100 defined by the partition member to increase the combustion volume of the gas generating agent. The partition member with such a function may also be formed into shapes shown in FIGS. 4 to 7 as well as the shapes of FIGS. 2A, 2B and FIG. 3.

Figure 4A:
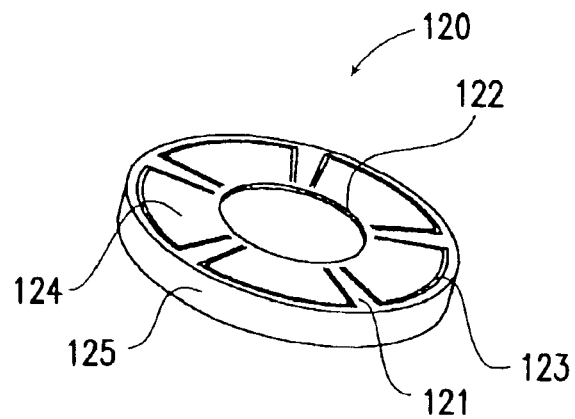
FIGS. 4A and 4B are perspective views of still another configuration of the partition member.
Figure 4B:
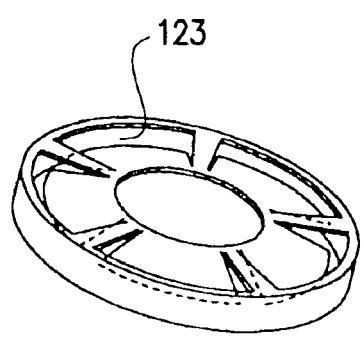

A partition member 120 shown in FIG. 4A has its pressure receiving portion 121 cut with fan-shaped slits 123 with a part close to an inner circumference 122 left uncut. In addition to the fan shape, the slits 123 may also be formed into any other appropriate shape that will allow a part 124 enclosed by the slit to be deflected toward the space portion. In this example, the part 124 enclosed by the slits 123 is deflected toward the space portion by the combustion of the gas generating agent, as shown in FIG. 4B, virtually expanding and deforming a part of the partition member 120 (in this embodiment, the part enclosed by the slit). As a result, the gas generating agent accommodating portion 24 in FIG. 1 communicates with the space portion, increasing the combustion volume of the gas generating agent. In the partition member 120 shown in FIGS. 4A and 4B, the outer circumference 125 is bent like a wall so that the partition member can be fitted in the inner surface of the coolant/filter and fixed at a predetermined location in the housing.

Figure 5:
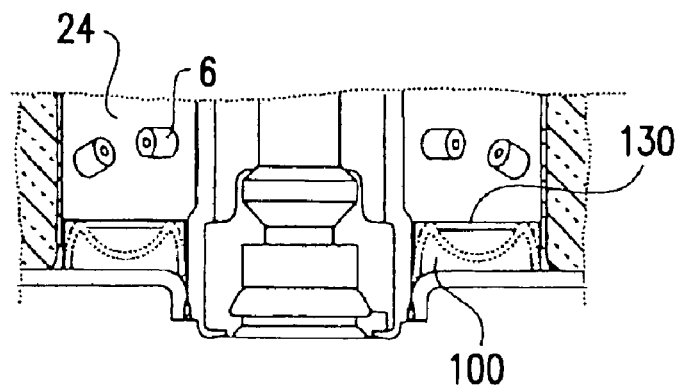
FIG. 5 is a perspective view of a further configuration of the partition member.

FIG. 5 illustrates another example of a partition member 130 that can change its entire shape upon combustion of the gas generating agent 6. That is, the partition member 130 in this example supports the gas generating agent 6 installed in the gas generating agent accommodating portion 24 to define the space portion 100 and is made of a material whose strength, shape and thickness are so determined that the partition member 130 collapses when subjected to the pressure generated by the combustion of the gas generating agent 6. As a result, the partition member 130 is deformed as a whole by the combustion of the gas generating agent to increase the combustion volume of the gas generating agent. When the deformation of the partition member 130 is used to increase the combustion volume, the increased combustion volume is relatively small compared with an increase in the combustion chamber achieved by the destruction and displacement of the partition member described above. Thus to realize a more effective combustion characteristic, the outer container shells (the diffuser shell and the closure shell) too may be expanded during the combustion of the gas generating agent. In this case, it is also possible to increase the combustion volume by expanding only the container shell.

Figure 6:
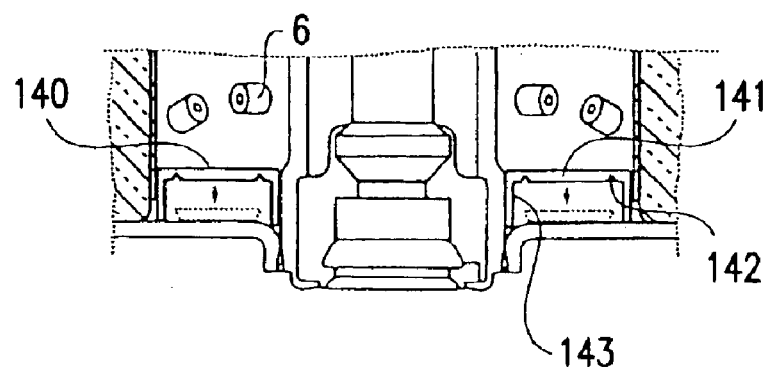
FIG. 6 is a perspective view of a further configuration of the partition member.

A further example of a partition member 140 shown in FIG. 6 has grooves as weak portions 142 cut in the back of a pressure receiving surface 141 of the partition member in a depth that allows the pressure receiving surface 141 to be broken by the combustion of the gas generating agent 6. Upon breakage of these weak portions, the pressure receiving portion moves in a direction of arrow in the figure to make the gas generating agent accommodating portion 24 communicate with the space portion 100. As a result, the combustion of the gas generating agent 6 can increase the volume of the gas generating agent accommodating portion 24. The weak portions 142 can be formed not only on the back of the pressure receiving portion 141 but also, for example, in the front side of the pressure receiving portion 141 or in a bent leg portion 143 at the inner circumference or outer circumference. The weak portions 142 may be formed in any desired shape as long as it can be cut open by the combustion of the gas generating agent 6 and thereby increase the combustion volume of the gas generating agent.

Figure 7:
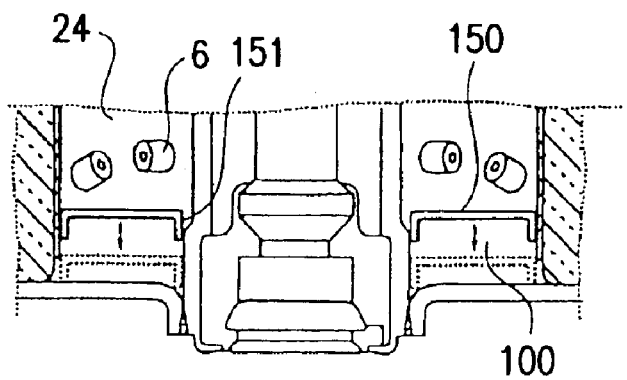
FIG. 7 is a perspective view of a further configuration of the partition member.

In an example shown in FIG. 7, a partition member 150, upon combustion of the gas generating agent 6, is displaced (or moved) in a direction of arrow in the figure to increase the volume of the gas generating agent accommodating portion 24. In this embodiment, the partition member 150 is fixed by press-fitting its edge portion 151 in the inner cylinder member and supports the gas generating agent 6. The partition member 150 is pushed down by the burning gas generating agent 6 toward the space portion 100, i.e., in the direction of arrow in the figure, thus increasing the volume of the gas generating agent accommodating portion 24. Therefore, in this embodiment, the partition member 150 is securely fixed when the gas generator is not activated and the degree to which the partition member is fixed needs to be adjusted so that it can be displaced (or moved) by the combustion of the gas generating agent 6.

In view of the fact that the above partition member is used to increase the volume of the gas generating agent accommodating portion 24 upon combustion of the gas generating agent, the partition member, rather than being formed in the configurations explained by referring to FIGS. 2 to 7, may also be formed by using an easily combustible material (such as paper) so that the partition member can also be burned by the burning gas generating agent.

Embodiment 2

A second embodiment of the airbag gas generator of this invention accommodates in its housing with gas discharge ports an ignition means triggered by an impact and a gas generating agent ignited and burned by the ignition means, and is characterized in that the gas discharge ports are closed by a seal tape that is burst at an initial stage of the gas generator operation.

In a gas generator that bursts the seal tape at an initial stage of gas generator operation, when a design of the inner structure of the gas generator permits gas generation in two stages for example to burst the seal tape at an initial stage of the gas generator activation or, in more concrete terms, when a first-stage combustion gas is generated in an initial stage of the gas generator operation to break the seal tape, followed by a second-stage of gas being discharged from the gas discharge ports; the operation performance of the gas generator can be adjusted by rupture of the seal tape in the initial stage of the operation as described above.

Such an airbag gas generator that generates a gas in two stages can be realized for example by a gas generator, in which the ignition means contains a transfer charge for igniting and burning the gas generating agent; in which the housing has a first passage through which to pass a combustion gas generated by the burning transfer charge and a second passage through which to pass a combustion gas generated by the gas generating agent burned by the combustion gas of the transfer charge; and in which the combustion gas of the transfer charge passing through the first passage is discharged directly. In this gas generator, if a bypass is formed as the first passage to discharge the combustion gas of the transfer charge directly out of the housing such that the combustion gas flowing through the first passage can swiftly reach the seal tape (i.e., gas discharge ports), then the seal tape can be broken at the initial stage of the gas generator operation by the combustion gas that has passed through the first passage. The second passage is the one to pass a combustion gas of the gas generating agent ignited by the combustion gas of the transfer charge and which does not pass through the first passage. The combustion gas of the gas generating agent inflates the airbag (bag body) sufficiently. At this time a greater amount of gas is discharged than that which was discharged earlier out of the gas generator through the first passage. The combustion gas passing through the second passage is discharged following the combustion gas that was discharged through the first passage. With this construction it is possible to realize a gas generator which has a tank curve characteristic in a tank combustion test such that the tank pressure measured at 0.25×T milliseconds will be 0.25×P (kPa) or less where a desired tank maximum pressure is P (kPa) and a period of time from the start of rising of the tank pressure to the time when the maximum pressure P (kPa) is reached is T milliseconds and that the peak of the combustion maximum internal pressure occurs 10–20 milliseconds after the ignition current is applied. Therefore, excess impacts on the passenger during the initial stage of the gas generator operation can be suppressed.

The first and second passages may be. formed as follows. Let Us consider a construction of the airbag gas generator in which an inner cylinder member is installed in the housing to form an ignition means accommodating chamber inside the inner cylinder member and a gas generating agent combustion chamber outside the inner cylinder member, and in which the ignition means installed in the ignition means accommodating chamber contains a transfer charge for igniting and burning the gas generating agent. In this construction, rows of through holes may be formed in the inner cylinder member along its circumference on horizontal planes at different heights and a through hole row formed on one of the horizontal planes (or preferably a. through hole row formed on a horizontal plane on the diffuser shell side) is provided with the first passage which may be formed by dividing the combustion chamber with a partition plate or by installing a pipelike member connecting to that row of through holes in order to lead the gas generated by the burning transfer charge and discharged through that row of through holes directly to the filter means without passing it through the gas generating agent accommodating portion. The direct discharge of the gas of the burning transfer charge out of the housing can also be achieved by forming openings in the housing at a predetermined location corresponding to the transfer charge accommodating portion in the ignition means accommodating chamber and by directly discharging the gas produced by the burning transfer charge through the openings. In this case, the openings are preferably closed with a seal tape.

Figure 8:
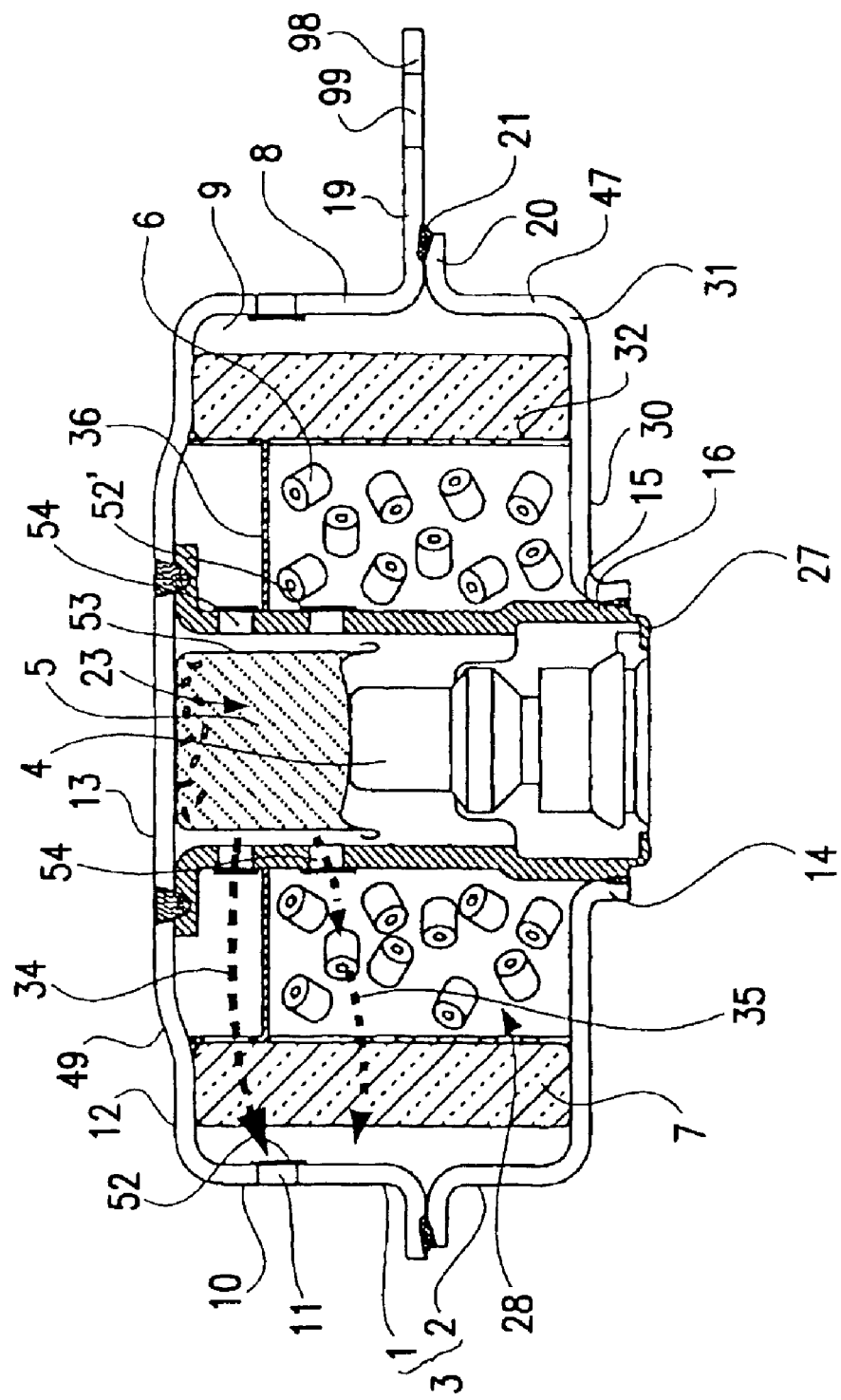
FIG. 8 is a vertical cross section of another embodiment of the gas generator of this invention.
Figures 9, 10:
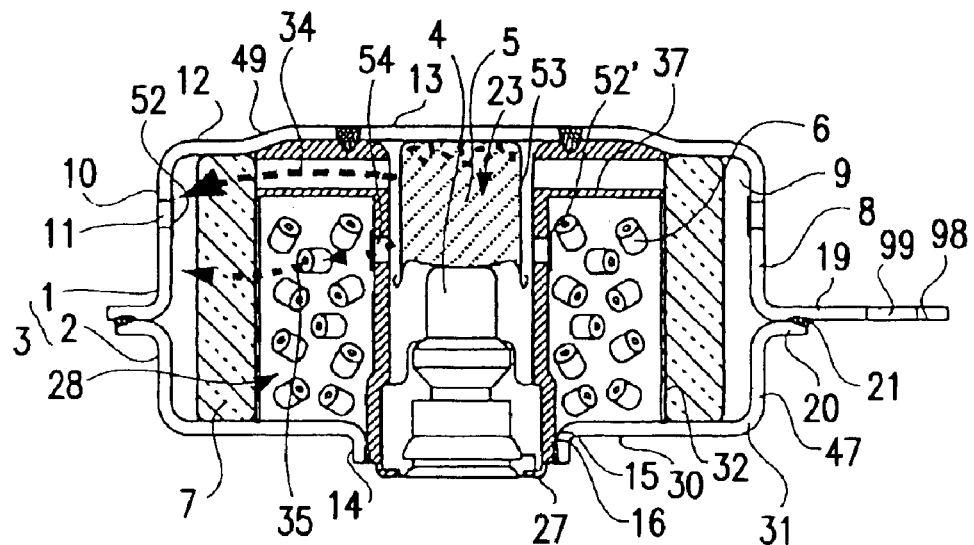
FIG. 9 is a vertical cross section of still another embodiment of the gas generator of this invention.
FIG. 10 is a vertical cross section of a further embodiment of the gas generator of this invention.

Examples of the second embodiment of the airbag gas generator of the present invention with the above construction are shown in FIGS. 8 to 10.

FIG. 8 shows a second embodiment of the airbag gas generator of this invention.

The gas generator shown in this figure includes: ignition means containing the transfer charge 5 for igniting and burning the gas generating agent 6; and a first passage 34 and a second passage 35, both formed in the housing 3, the first passage 34 passing a combustion gas generated by the burning transfer charge 5, the second passage 35 passing a combustion gas generated by the gas generating agent 6 ignited and burned by the burning transfer charge. The combustion gas passing through the first passage 34 is discharged without igniting and burning the gas generating agent 6. The gas passing through the first passage 34 therefore swiftly reaches the gas discharge ports 11 (in the initial stage of the gas generator operation), breaks a seal tape 52 that closes the gas discharge ports 11, and is discharged out of the housing 3. In this embodiment, the transfer charge 5 may be mixed with the gas generating agent 6 or entirely replaced with the gas generating agent 6. In this case, the gas generating agent used in place of the transfer charge is distinguished from the gas generating agent 6 installed beforehand in the combustion chamber 28 in that the combustion gas of the former passes through the first passage and, in the initial stage of the gas generator operation, breaks the seal tape 52 that closes the gas discharge ports 11. The gas generating agent 6 may also have other shapes than the hollow cylinder body shown in FIG. 1. Because the gas generator of this embodiment has two passages and the combustion gas passing through the first passage breaks the seal tape 52 to release a small amount of gas out of the housing during the initial stage of the gas generator operation, followed by the release of a large volume of combustion gas through the second passage, the same effect of this invention can be produced even if the gas generating agent 6 has other shapes than the hollow cylinder.

In this embodiment, the first passage 34 is formed as a bypass to directly release the gas produced by the combustion of the transfer charge 5 to the outside of the housing 3. Let us consider the construction of an airbag gas generator as shown in FIG. 8, in which the inner cylinder member 16 installed in the housing 3 has rows of through holes 54 formed in its circumferential wall on horizontal planes at different heights, with the inner side of the inner cylinder member 16 used as the ignition means accommodating chamber 23 and the outer side as the combustion chamber 28 for the gas generating agent 6, and in which the ignition means including the transfer charge 5 for igniting and burning the gas generating agent 6 is installed in the ignition means accommodating chamber. In this construction, the interior of the combustion chamber 28 may be divided by a partition plate 36 to form the bypass (first passage 34) such that the combustion gas generated by the transfer charge 5 and discharged from a through hole row 54' formed in the inner cylinder member on one of the different horizontal planes (in FIG. 8, on the horizontal plate on the diffuser shell 1 side) can be led directly to the coolant/filter 7 through this bypass without burning the gas generating agent 6.

As to this first passage 34, it is possible, as shown in FIG. 9, to integrally form the inner cylinder member 16 with radially extending several pipe-like members 37, which lead the combustion gas of the transfer charge 5 discharged from a row of through holes 54 formed on one of the horizontal planes directly to the coolant/filter 7, and to use the inner space of the pipe-like members 37 as the first passage 34.

Further, as shown in FIG. 10, where the through holes that are formed in the inner cylinder member 16 defining the combustion chamber 28 and the ignition means accommodating chamber 23 in the housing are almost aligned horizontally (including the case where the through holes are arranged in a staggered manner), the housing may be formed with an opening 38 covering an area corresponding to a location where the transfer charge is contained in the ignition means accommodating chamber 23 so that the combustion gas of the transfer charge 5 can be discharged directly from the opening 38. In this case, the opening 38 is preferably closed with a seal tape 52".

In the airbag gas generators shown in FIGS. 8 to 10, the second passage 35 is the passage for the combustion gas of the gas generating agent 6. The combustion gas of the transfer charge 5 is discharged from the through holes 54 formed in the inner cylinder member 16 over the area where the inner cylinder member 16 defines the ignition means accommodating chamber 23 on the inner side and the combustion chamber 28 on the outer side. The combustion gas produced by the burning gas generating agent 6 is cooled and cleaned by the coolant/filter 7 before being discharged from the gas discharge ports 11.

In the embodiment shown in FIGS. 8 and 9, the combustion gas of the transfer charge 5 passing through the first passage 34 arrives at the seal tape 52 (i.e., the gas discharge ports 11) earlier than the combustion gas of the gas generating agent 6 passing through the second passage 35 and breaks the seal tape 52 in the initial stage of the gas generator operation. After this, the combustion gas of the gas generating agent 6 ignited and burned by the flames of the transfer charge 5 and passing through the second passage 35 reaches the gas discharge ports 11, from which it is discharged out of the housing 3. In this way the gas is exhausted in two stages.

As a result, these examples of the gas generator of this embodiment have operation performances adjusted such that the tank pressure measured at 0.25×T milliseconds will be 0.25×P (kPa) or less, where a desired tank maximum pressure in the tank combustion test is P (kPa) and a period of time from the start of rising of the tank pressure to the time when the maximum pressure P (kPa) is reached is T milliseconds. In FIGS. 8 to 10 representing this embodiment, members identical to those of FIG. 1 are assigned the same reference numbers and their explanations are omitted.

Embodiment 3

In addition to the embodiment 2, the gas generator that breaks the seal tape closing the gas discharge ports at the initial stage of the gas generator operation can also be realized by a gas generator described below. This gas generator accommodates in the housing with gas discharge ports, ignition means triggered by an impact, a gas generating agent ignited and burned by the ignition means for producing a combustion gas, and filter means for cooling the combustion gas and/or arresting combustion residue. In this gas generator, the combustion gas produced as a result of the operation of the ignition means is discharged through the filter means and nothing is provided in the gas passage except for the filter means. The filter means mentioned above includes a filter conventionally provided to clean the combustion gas of the gas generating agent, a coolant to cool the gas, and a coolant/filter having both of these functions (i.e., cleaning and cooling of the gas). In the gas generator of this invention, in which an inner cylinder member is arranged in the housing to define an ignition means accommodating chamber on the inner side of the inner cylinder member and a combustion chamber on the outer side, and in which the ignition means includes a transfer charge for igniting and burning the gas generating agent; a coolant support (or coolant support member)—which is arranged on the inner side of the filter means to protect the filter means arranged around the combustion chamber against flames of the transfer charge ejected from the through-holes of the inner cylinder member-needs to be formed or omitted so that it does not obstruct the passage running from the through holes to the gas discharge ports. Where the ignition means comprises an igniter and a transfer charge, the combustion gas generated by the activation of the ignition means represents a combustion gas from the transfer charge ignited and burned by the activation of the igniter.

Figure 11:
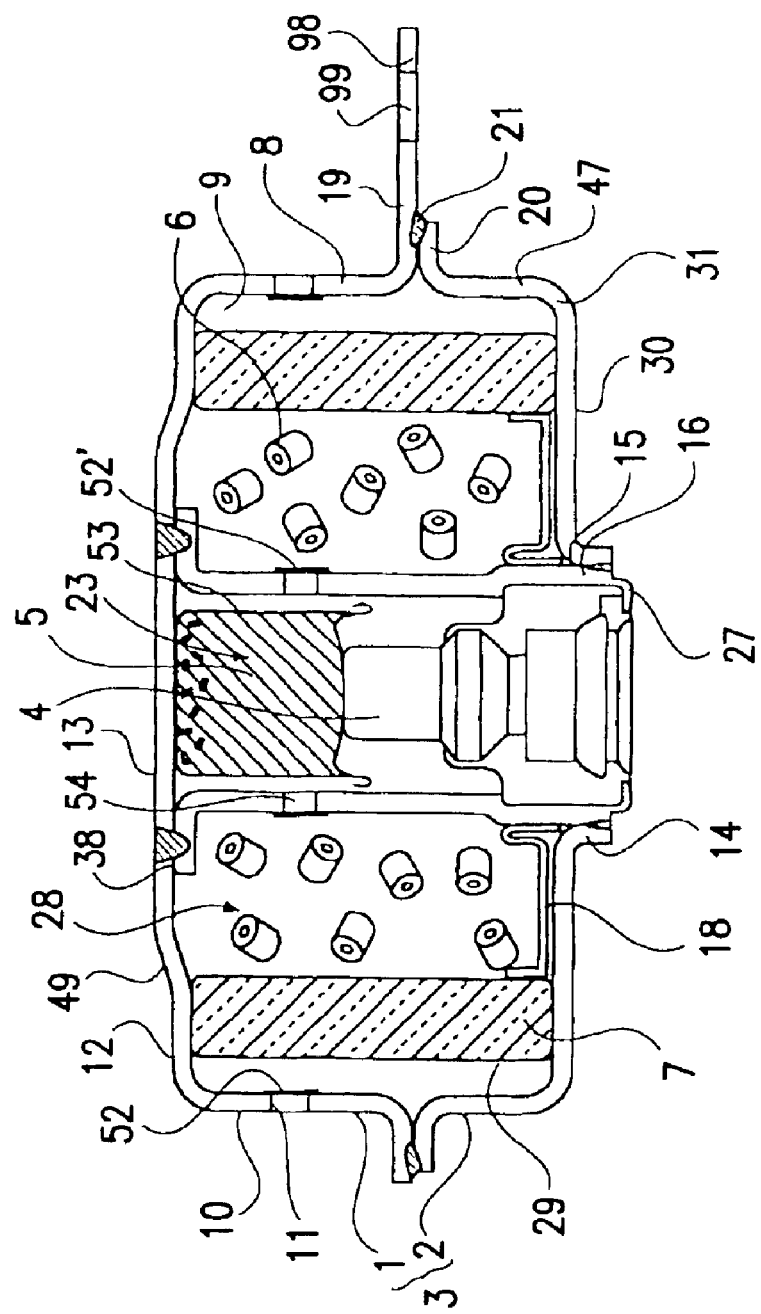
FIG. 11 is a vertical cross section of a further embodiment of the gas generator of this invention.

FIG. 11 shows a vertical cross section of the airbag gas generator as one example of Embodiment 3.

The airbag gas generator of this embodiment includes, in the housing 3 with gas discharge ports 11, ignition means activated by an impact to generate a combustion gas, a gas generating agent 6 ignited and burned by the combustion gas of the ignition means to produce a combustion gas, and filter means, i.e., coolant/filter 7 for cooling the combustion gas and/or arresting combustion residue, wherein the combustion gas generated by the activation of the ignition means is discharged directly through the coolant/filter 7 and nothing except for the coolant/filter 7 exists in the combustion gas passage.

In the gas generator shown in this embodiment, because the flow of the combustion gas generated by the activation of the ignition means is not obstructed by members other than the coolant/filter 7, the combustion gas quickly reaches the gas discharge ports 11 and breaks the seal tape 52 that closes the gas discharge ports 11 in the initial-stage of the gas generator operation.

Where the ignition means is formed by combining, as shown in FIG. 11, the igniter 4 triggered by an impact and the transfer charge 5 ignited and burned by the activation of the igniter to produce a combustion gas, the combustion gas described above which is generated by the activation of the ignition means represents a combustion gas generated by the combustion of the transfer charge.

The coolant/filter 7 may use a known filter conventionally used to clean a gas produced as a result of combustion of the gas generating agent, a known coolant used to cool the gas, and means having these two functions (cleaning and cooling of the gas). The coolant/filter 7 can be omitted when the gas generating agent used does not produce combustion residue and its gas need not be cooled.

In the gas generator shown in FIG. 11, the inner cylinder member 16 is installed in the housing 3 to define an ignition means accommodating chamber 23 on the inner side of the inner cylinder member and a combustion chamber 28 on the outer side, and the ignition means installed in the ignition means accommodating chamber 23 includes a transfer charge 5 for igniting and burning the gas generating agent. The inner cylinder member 16 has a plurality of through holes 54 formed therein to pass flames of the burning transfer charge 5 into the combustion chamber 28. The combustion gas (or flames) ejected from the through holes 54 ignites those pieces of the gas generating agent 6 near the gas passage, quickly reaches the seal tape 52 closing the gas discharge ports 11 and breaks it at the initial stage of the gas generator operation. The flames of the gas generating agent 6 ignited by the combustion gas ejected from the through holes 54 in turn ignite the surrounding pieces of the gas generating agent 6, producing a large amount of combustion gas. The combustion gas produced by the combustion of the transfer charge 5 and the gas generating agent 6 now passes through the coolant/filter 7 and through the space 9 formed on the outer side of the coolant/filter 7, and is ejected from the gas discharge ports 11. In this case, the space 9 functions as a gas passage.

Because the gas generator shown in FIG. 11 has an object to fracture, especially at the initial stage of the gas generator operation, the seal tape 52 closing the gas discharge ports 11, it is required that no members that may block the flow of the combustion gas, except the coolant/filter 7, be present in the gas passage through which the combustion gas ejected from the through holes 54 formed in the inner cylinder member 16 flows to the gas discharge ports 11.

Figure 12:
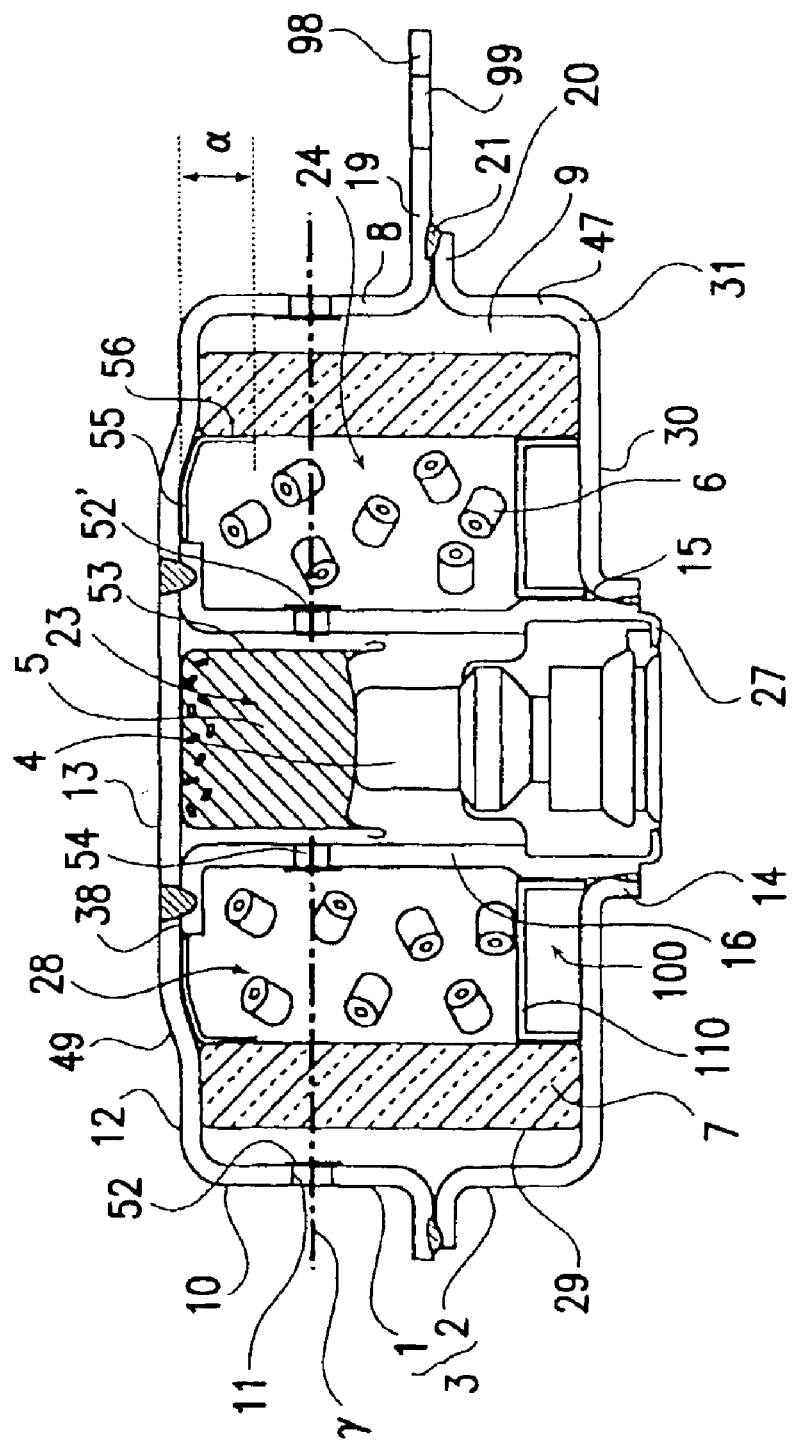
FIG. 12 is a vertical cross section of a further embodiment of the gas generator of this invention.

Thus, where a coolant support member 55 is installed, as shown in FIG. 12, in the combustion chamber 28 on the inner side of the diffuser shell 1 to prevent the displacement of the coolant/filter 7 and to eliminate a short pass through which the combustion gas flows between the coolant/filter 7 and the inner surface of the diffuser shell 1, a wall surface portion 56 of the coolant support member 55 that contacts the inner surface of the coolant/filter 7 needs to be limited in its length $\alpha$ so that it does not intercept a line $\gamma$ connecting the through holes 54 of the inner cylinder member 16 and the gas discharge ports 11. The gas generator shown in FIG. 12 divides the interior of the gas generating agent combustion chamber by the partition member 110 into the gas generating agent accommodating portion 24 and the space portion 100 so that the combustion volume can be expanded into the space portion 100 upon combustion of the gas generating agent.

In the gas generators shown in FIGS. 11 and 12, the combustion gas generated from the transfer charge 5 directly passes through only the coolant/filter 7 and quickly reaches the gas discharge ports 11. Then, the gas fractures the seal tape 52, which seals the gas discharge ports 11, at the initial stage of the gas generator operation and is discharged from the gas discharge ports 11.

The airbag gas generator of this embodiment, too, may have an operation performance such that the tank pressure measured at 0.25×T milliseconds will be 0.25×P (kPa) or less where a desired tank maximum pressure in a tank combustion test is P (kPa) and a period of time from the start of rising of the tank pressure to the time when the maximum pressure P (kPa) is reached is T milliseconds and that the peak of the combustion maximum internal pressure occurs 10–20 milliseconds after the ignition current is applied.

In FIGS. 11 and 12 representing this embodiment, members identical to those of FIG. 1 are assigned the same reference numbers and their explanations are omitted. In FIG. 11, reference number 18 represents an annular underplate that supports the gas generating agent 6.

Embodiment 4

As described in the above embodiment, the gas generator of this invention has its operation performance or tank curve in the tank combustion test adjusted such that the tank pressure measured at 0.25×T milliseconds will be 0.25×P (kPa) or less and the combustion internal pressure will reach its maximum 10–20 milliseconds after the ignition current is applied, followed by a sharp rise in the tank pressure, thus describing a so-called S-shaped tank curve, where a desired tank maximum pressure is P (kPa) and a period of time from the start of rising of the tank pressure to the time when the maximum pressure P (kPa) is reached is T milliseconds. In this case, it was found that if sealing means that seals the gas generating agent in the housing from the atmosphere outside the housing is rapidly ruptured by improving the output of the ignition means, the operation performance of the gas generator can be improved.

The above sealing means may, for example, be the seal tape that closes the gas discharge ports formed in the housing. In this embodiment, the seal tape may be an aluminum tape 50 µm thick, which is ruptured within 3 milliseconds of the application of the ignition current at normal temperature of, for example, 20° C. at the initial stage of the gas generating operation to release the gas, raising the tank curve.

The "fracture of the sealing means" includes not only a physical deformation of the sealing means, the phenomenon in which as the pressure in the housing of the gas generator increases, the sealing means such as a seal tape that closes the gas discharge ports to protect the gas generating agent from external moisture cannot withstand the pressure and is broken-but also a situation where the seal means pasted to a predetermined position becomes peeled off to open the gas discharge ports, communicating the atmospheres of the inside and outside of the housing. The seal tape has an appropriate bonding area for the gas discharge ports to seal off the external moisture. When this bonding area is made relatively small, the sealing means may at some point of an increasing pressure in the housing succumb to be pushed outside and peeled off, communicating the atmospheres of the outside and inside of the housing. Such a separation of the seal tape from the gas discharge ports is of course included in the fracture of the seal means.

The gas generator with such a structure can be realized by a gas generator which comprises: single ignition means activated by an impact and a gas generating agent ignited and burned by the ignition means to produce a combustion gas, both accommodated in the housing with gas discharge ports, the ignition means containing an igniter; wherein the igniter has an output of 700 psi or more, or preferably 1000–1500 psi in a normal-temperature (20° C.) atmosphere when the igniter is burned in an airtight cylinder with a volume of 10 cc.

Figure 13:
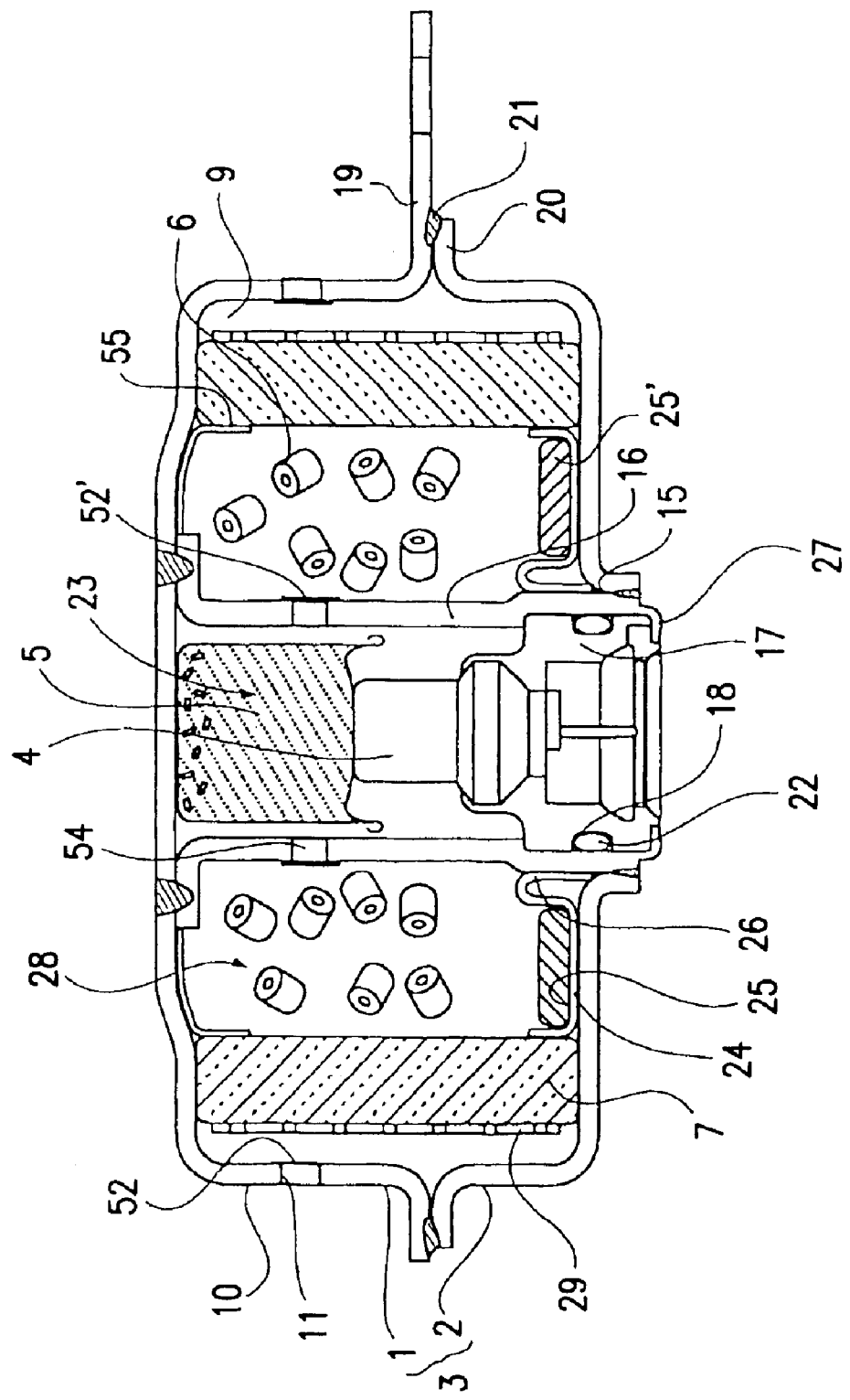
FIG. 13 is a vertical cross section of a further embodiment of the gas generator of this invention.

FIG. 13 shows a fourth embodiment of the airbag gas generator of this invention.

Figure 14:
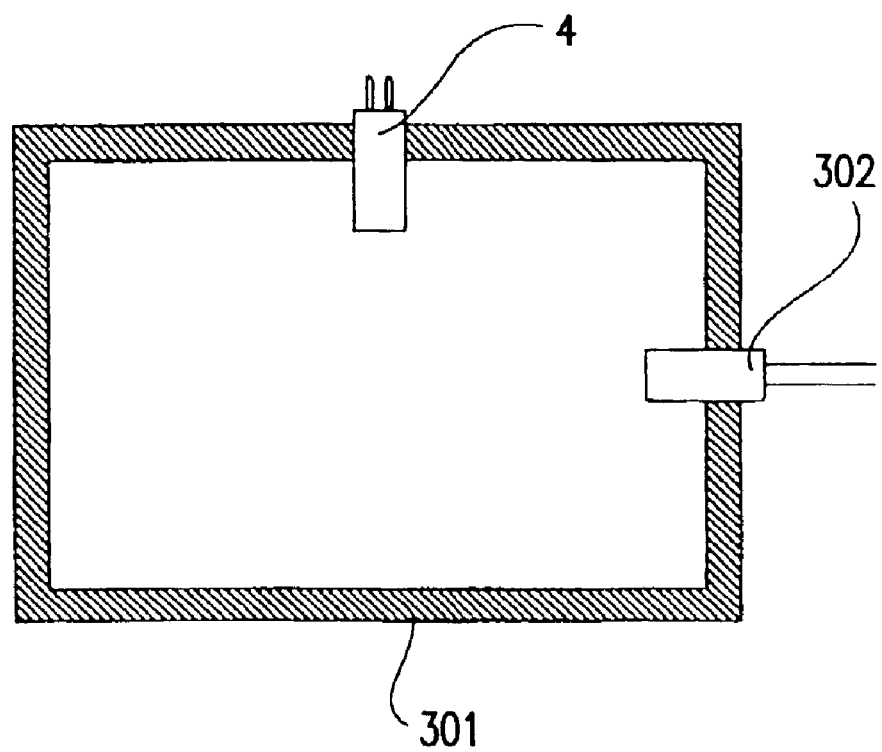
FIG. 14 is a simplified vertical cross section showing the igniter in a bomb during an output test.

In FIG. 13, the gas generator includes in the housing with gas discharge ports single ignition means triggered by an impact and gas generating means ignited and burned by the ignition means to generate a combustion gas. The ignition means for igniting the gas generating agent 6 comprises the transfer charge 5 and the igniter 4. The igniter 4, when it is burned in an airtight bomb 301 with a volume of 10 cc as shown in FIG. 14, has an output of 700 psi or more, preferably 1000–1500 psi, in the normal-temperature (20° C.) atmosphere. The use of this igniter makes it possible to fracture the seal tape and release the gas within 3 milliseconds of the start of operation, realizing the above-mentioned S-shaped tank curve. The output of this igniter 4 can be measured by a manometer 302 installed in the airtight bomb 301. The igniter 4 with such a high output may use 260–280 mg of chemicals (ZPP) made of, for example, zirconium and potassium perchlorate. The housing may have 16 gas discharge ports 11 with an inner diameter of, for example, 2.7 mm formed in the circumferential direction.

Figure 15A:
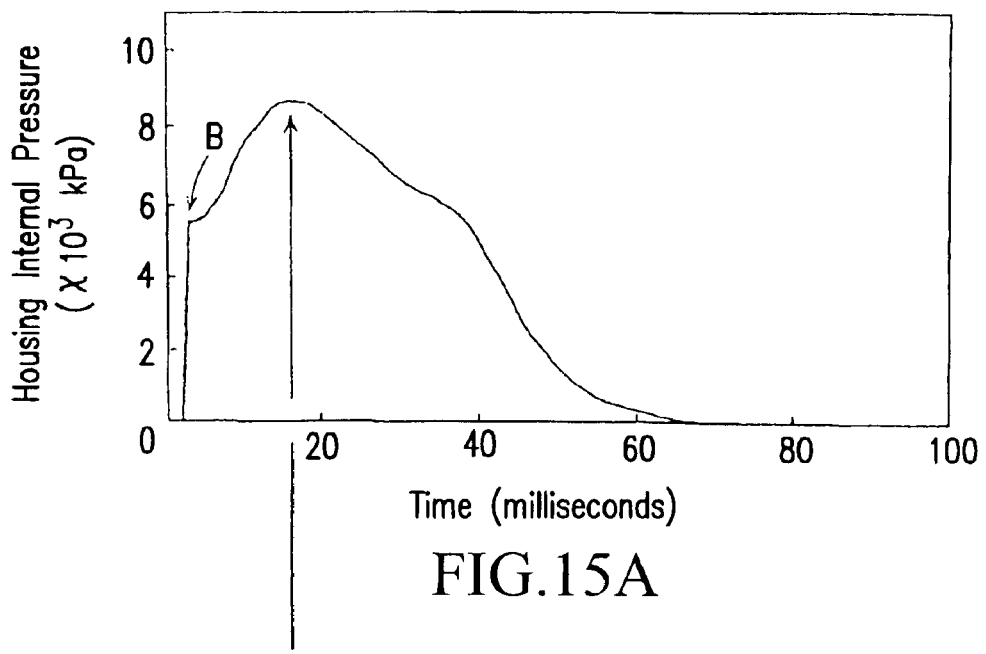
Figure 15B:
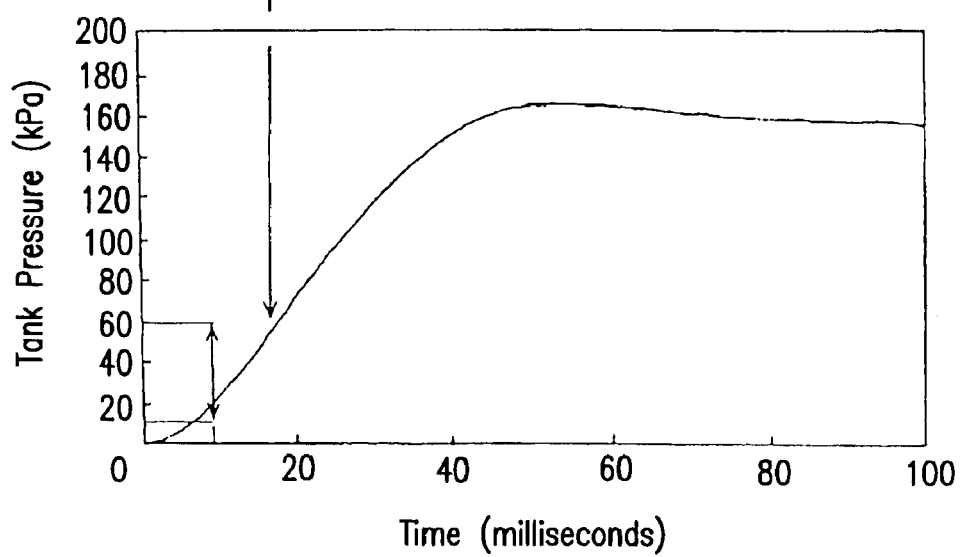

The gas generator of this embodiment using the igniter with an enhanced output described above quickly raises the housing internal pressure by the expansion of air in the housing by heat and breaks the seal tape 52, which closes the gas discharge ports of the housing, within 3 milliseconds of the application of the ignition current, for example at 2.5 milliseconds, in the 20° C. atmosphere. Because the fracture of the seal tape 52 occurs immediately after the gas generating agent has started to burn, i.e., when the flames of the transfer charge reach the gas generating agent, the combustion of the gas generating agent and rising of the internal pressure are hindered temporarily but the tank pressure begins to rise because of a small amount of gas released into the tank. After this, the flames reach the entire gas generating agent, igniting it and releasing a large amount of gas. This sequence of combustion realizes the so-called S-shaped tank pressure curve whereby the tank pressure measured at 0.25×T (ms) is 0.25×P (kPa) or lower. This allows the airbag to be expanded in such a way that the impacts on a passenger at the initial stage of airbag operation is alleviated but the passenger can be reliably held by a sufficient amount of gas generated immediately thereafter. In the tank combustion test, the tank pressure curve rises within 3 milliseconds and the pressure measured at 0.25×T (ma) is 7–25% of the tank maximum pressure P. One example of measurements in the tank combustion test of such a gas generator is shown in FIG. 15. FIG. 15A shows a change over time of the housing internal pressure in the tank combustion test and FIG. 15B a tank pressure curve in the test. This figure represents the results of a 60-liter tank combustion test of a gas generator whose igniter, shown at numeral 4 in FIG. 13, has an output of 1300 psi rather than the conventional 700 psi or less. As shown in FIG. 15, the inflator inner pressure rises to a level that breaks the seal tape at 2.5 milliseconds. The tank pressure at 10 milliseconds is 10–60 kPa, preferably 10–50 kPa and more preferably 10–40 kPa. At this point, the flames of transfer charge have just begun to reach the gas generating agent and the seal tape is ruptured to release the inner pressure, which temporarily hinders the combustion of the gas generating agent. Hence, the inner pressure rise temporarily sags but the tank pressure starts to rise because of the released gas. After this, when the inner pressure of the inflator becomes maximum, an inflection point occurs in the tank pressure curve.

With this embodiment, the output of the initiator (igniter) is enhanced to raise the inflator inner pressure early and thereby realize an S-shaped tank output curve with a desired inflection point. The amount by which the output of the initiator of this embodiment exceeds that of the conventional initiator contributes mainly to generating heat or high-temperature gas to purely raise the initial inner pressure early without affecting the ignition performance of the gas generating agent. This effect can also be realized by burning the transfer charge to generate heat or high-temperature gas. But the boron potassium nitrate (B/KNO$_3$) conventionally used as the transfer charge produces heat residue (heat mist) during combustion and an increase in the amount of this transfer charge increases the ignitability of the gas generating agent by heat residue, making it difficult to produce an S-shaped output curve. Hence, to obtain the S-shaped tank output curve by the transfer charge, the transfer charge used needs to generate mainly high-temperature gas or heat when burned and be increased in amount to enhance the output of the ignition means. The transfer charge which mainly produces hot gas or heat during combustion includes, for example, a nitroguanidine/ammonium nitrate-based non-azide gas generating agent.

In FIG. 13, reference number 17 represents a cylindrical collar member having a groove 18, reference number 22 an O-ring installed in the groove 18, and reference number 55 a coolant support member 55. In FIG. 13, members identical with the corresponding members of FIG. 1 are assigned like reference numbers and their explanations are omitted.

Embodiment 5

The gas generator that achieves the rapid fracture of the seal tape (ruptured within 3 milliseconds of the application of ignition current in the 20° C. atmosphere) shown in the above embodiment 4 can also be realized by restricting the thickness of the seal tape closing the gas discharge ports and/or the inner diameter of the gas discharge ports as well as by improving the output of the ignition means.

This embodiment will be described by referring to the airbag gas generator shown in FIG. 13. In FIG. 13, the gas discharge ports 11 of the housing 3 of the gas generator are closed by the seal tape 52, whose thickness is restricted such that it will be broken within 3 milliseconds of the application of ignition current to release the gas. Because the seal tape 52 is ruptured within 3 milliseconds of the application of ignition current and releases the gas, the combustion of the gas generating agent and therefore the inner pressure rise, both of which have just begun, temporarily sag but the tank pressure starts to rise because of the discharged combustion gas of the transfer charge. Then, the entire gas generating agent catches fire, producing a large amount of gas, with the result that the gas generator exhibits the operation performance described above.

The conventional igniter with the normal output, i.e., the one whose output is 700 psi or less in the 20° C. atmosphere, can be used as the igniter 4.

Figure 16:
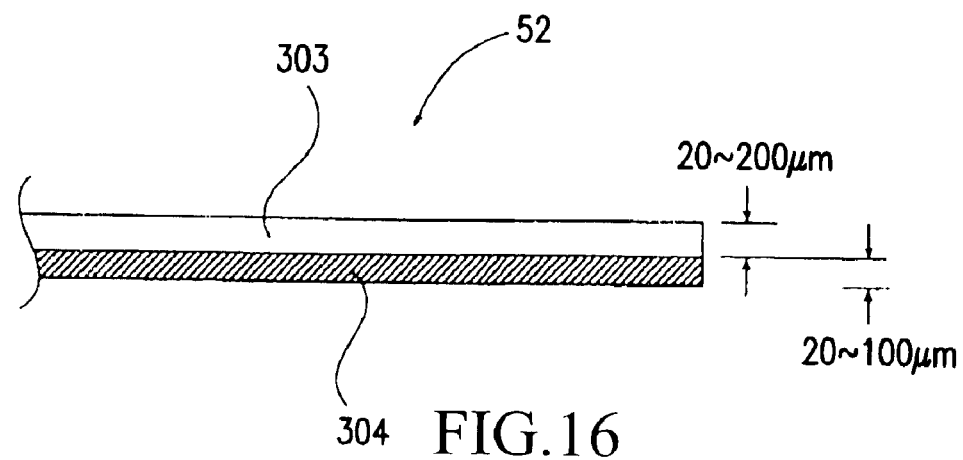
FIG. 16 is a cross section of a two-layer seal tape.

FIG. 16 shows a cross section of this seal tape 52. The seal tape 52 comprises a sealing layer 303 for preventing ingress of moisture into the housing and a bonding layer or adhesive layer 304 for bonding the sealing layer to the housing. The sealing layer has a thickness of 20–200 μm and is preferably made of an aluminum or other foil or more preferably of a metal foil and a resin sheet laminated over the foil. When the sealing layer thickness is less than 20 μm, there is a possibility of the sealing layer being broken due to contact during assembly and transport. To ensure that the sealing layer will be ruptured at a desired timing, its thickness is preferably set to about 50 μm. The bonding layer or adhesive layer has a thickness of 20–100 μm and may use a variety of adhesive or bonding agents such as pressure type adhesive and hot melt-based adhesive. Of these, an acrylic bonding agent is preferred. The bonding layer or adhesive layer normally spreads over the entire surface of the sealing layer as shown in FIG. 16 but can be set so that it does not exist only in areas corresponding to the gas discharge ports.

Further, an igniter with a higher output, as described in the embodiment 4, may also be used to produce an improved effect.

The inner diameter of the gas discharge ports may be restricted such that the seal tape closing the gas discharge ports will be ruptured within 3 milliseconds of the application of ignition current in the 20° C. atmosphere. In that case, the inner diameter of the gas discharge ports 11 is determined in the range of 1.5–10 mm considering the output of the igniter 4 and the material and thickness of the seal tape.

The inner pressure of the gas generator, as described above, is raised by a combustion gas generated as a result of ignition of the gas generating agent to fracture the seal tape, from whose ruptured portions the combustion gas is released to the outside. The fracture pressure at which the seal tape is broken needs to be set in a desired range such that the seal tape can be ruptured within 3 milliseconds of the application of ignition current to release the gas. As a means to realize this, the thickness of the seal tape and the diameter of the gas discharge ports are adjusted. When a seal tape of equal thickness is used, the larger the diameter of the gas discharge ports, the lower the fracture pressure will be. When the gas discharge ports are equal in diameter, the thinner the seal tape thickness, the lower the fracture pressure will be. Thus, a desired fracture pressure can be obtained by combining both of these conditions. The fracture pressure is set at 100 kg/cm$^2$ or less, preferably in a range of 70–40 kg/cm$^2$. The relationship between the nozzle diameter and the seal tape thickness that satisfies this requirement, when the seal tape is made of soft aluminum, is a nozzle diameter of 1.5–3 mm for the seal tape thickness of 50 μm, about 4 mm in diameter for 100 μm in thickness, and about 10 mm in diameter for 200 μm in thickness. Too low a pressure will render the ignition unstable and too high a pressure will result in the gas generating agent catching fire undesirably fast, making it difficult to produce a desired tank characteristic.

To measure the fracture pressure, a manometer for measuring the housing inner pressure is installed in the gas generator. With a point in time when a current is applied to the igniter taken as 0, the relation between time and the housing inner pressure is measured to obtain a pressure curve as illustrated in FIG. 15A. The sealing means, such as a seal tape, has an appropriate bonding area for the gas discharge ports such that it will not be ruptured or broken immediately when the housing inner pressure begins to rise and will withstand a certain pressure rise. This pressure withstandability lasts for a limited duration but at a certain point succumbs to the pressure allowing the sealing means to be broken or ruptured and releasing the pressure from the housing. The pressure release changes the housing inner pressure, which in turn causes a rapid change in the combustion performance of the gas generating agent. In terms of the change over time of the housing inner pressure, the inner pressure value that was rising continuously and linearly exhibits a sharp change at some point. This point (B in FIG. 15A) can be deemed as the moment when the seal tape is ruptured or destroyed. If there is any tank pressure rise before this point, it is not caused by the rise in the housing inner pressure now being discussed but is regarded as being caused by an accidental rupture of the seal tape. After the application of ignition current, there is a point in the combustion inner pressure curve at which the inner pressure, which was linearly changing with elapse of time because of the generated gas, exhibits a non-linear, but not sharp, change. This point is also regarded as a moment when the seal tape is ruptured. At this point, the seal tape that has so far sealed and resisted the pressure of the generated gas succumbs and ruptures releasing the inner pressure of the housing. Thus, it can be verified at this point on the combustion inner pressure curve that the housing inner pressure has started to exhibit a change that is different from the previous one.

Embodiment 6

The inventors have found as a result of further studies that in gas generators such as shown in the embodiment 1 to 5, if two or more kinds of gas discharge ports with different inner diameters and/or different opening areas are used in combination when forming the gas discharge ports in the diffuser housing, the early rupture of the seal tape and the resulting S-shaped tank pressure curve can be stably realized with high reproducibility. Such gas generators may be made by forming gas discharge ports with the larger diameter and those with the smaller diameter in combination in the diffuser housing and sealing them with the seal tape.

When forming gas discharge ports with the larger diameter and the smaller diameter in the housing, the diameter ratio between the larger and the smaller is suitably set at 4/1 to 1.1/1 and their opening area ratio is set in the range of 97/3 to 3/97.

Figure 18:
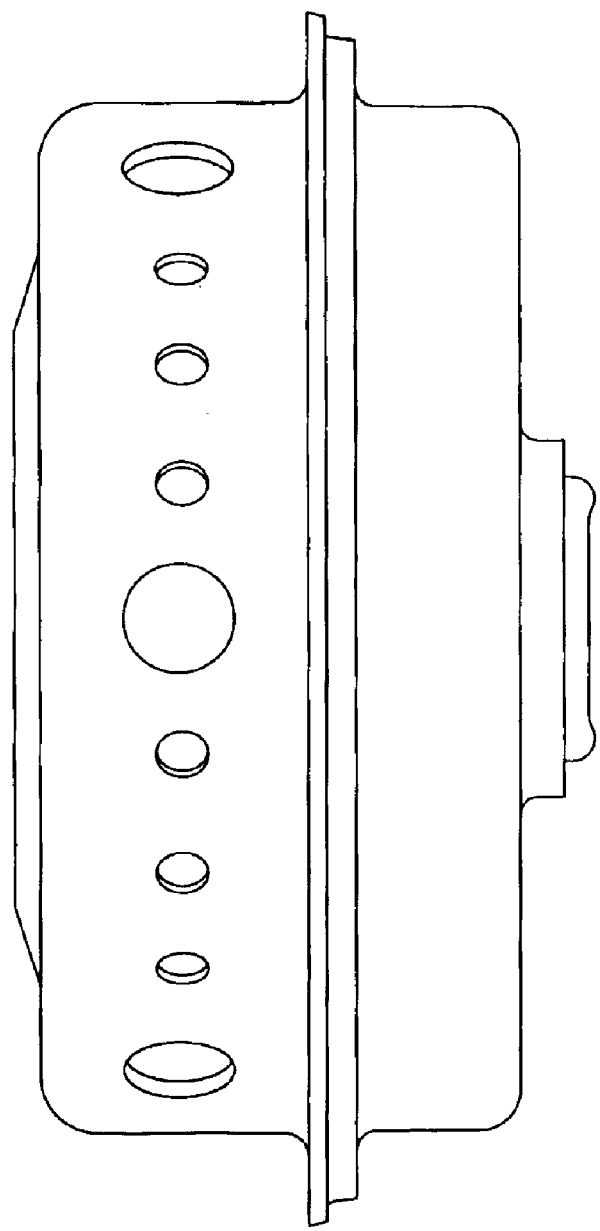
FIG. 18 shows an airbag housing including gas discharge ports including two different inner diameters.

In more concrete terms, five larger diameter gas discharge ports of 6 mm in the inner diameter and 15 smaller diameter gas discharge ports of 3 mm in the inner diameter are formed, in the housing of the gas generator shown in FIG. 18, at regular intervals in the circumferential direction, and these gas discharge ports are closed with seal tapes. In activation of this gas generator, the seal tape closing the larger diameter gas discharge ports with a 6-mm inner diameter will be ruptured at the initial stage and then when the combustion has further proceeded and the inner pressure has risen, the seal tape closing the smaller diameter nozzles or ports will be broken. When two kinds of gas discharge ports with the larger and the smaller diameters are formed this way, the overall opening area of these gas discharge ports is almost equal to that of 20 gas discharge ports with a 4-mm inner diameter. However, the seal tape closing the 6-mm larger diameter gas discharge ports becomes more easily rupturable because the larger diameter gas discharge ports are larger in the inner diameter and their number is smaller than the twenty 4-mm gas discharge ports. Therefore, relatively almost all the seal tapes for the larger diameter nozzles will be broken. After the seal tape closing the larger diameter gas discharge ports has been ruptured and as the gas generating agent continues to burn, the housing inner pressure rises, followed by breaking the seal tape that closes the smaller diameter gas discharge ports. All the seal tapes of the larger diameter discharge ports are ruptured with a relatively good reproducibility and eventually the gas generating agent combustion pressure at which the sealed smaller diameter nozzles are ruptured after the inner pressure has risen further is relatively constant. Therefore, the desired S-shaped tank output curve can be obtained with a good reproducibility.

When, on the contrary, 20 gas discharge ports with an inner diameter of 4 mm are formed in the gas generator, all of the twenty sealed ports or nozzles may not necessarily be ruptured simultaneously at the initial stage of combustion of the gas generating agent and they may be irregularly ruptured. If they are irregularly ruptured, the housing inner pressure in the initial stage of combustion of the gas generating agent tends to decrease when many seal tapes are broken and the total open area of the nozzles gets larger and to increase when a small number of the seal tapes are fractured and the total open area of the nozzles is small. As a result, there is no reproducibility of the housing inner pressure after the seal tape is ruptured, which in turn affects the subsequent initial combustion performance of the gas generating agent, degrading the reproducibility of the desired tank output curve.

Therefore, as described above, by using two kinds of gas discharge ports, the larger and the smaller, almost all of the seal tapes covering the larger diameter ports or nozzles are ruptured to obtain a constant open area of the ruptured nozzles. As a result, the influences on the combustion of the gas generating agent until the moment when the smaller diameter gas discharge ports are opened become constant, thus realizing a gas generator that has an operation performance with a stable S-shaped tank output curve.

With gas discharge ports of different sizes formed in combination, the gas generator has a stable pressure rise performance that is not affected by an open air temperature.

That is, when, for example, a gas generator is operated inside a 60-liter tank in a low-temperature atmosphere (or high-temperature atmosphere), the tank pressure rise performance also exhibits almost as stable an S-shaped tank output curve as at normal temperature. The gas generator, which is mounted on vehicles as part of the airbag system, is exposed to different temperatures depending on regions where it is used. Generally, when the temperature of the atmosphere in which the gas generator is operated is low, the combustion of the gas generating agent becomes more moderate than at normal temperature. Since the combustion inner pressure of the gas generator as a whole also decreases, the pressure rise performance can differ from the one obtained at normal temperature. For example, the tank pressure curve rise is delayed from the normal-temperature pressure rise. The tank output curve during the initial operation (measured at $0.25 \times T$ milliseconds) is outside the range from $0.07 \times P$ (kPa) to $0.25 \times P$ (kPa), which is different from the performance of the pressure rise at the normal temperature. The output and the maximum pressure of the gas generator, too, can vary greatly, influenced by the temperature of atmosphere. When, however, a plurality of kinds of nozzles, for example two kinds in size, the larger and the smaller, are provided in combination, all of the two kinds of seal tapes covering nozzles tend to fracture at normal temperature, whereas in a low-temperature atmosphere only the seal tapes covering the larger diameter nozzles that have the lower rupture pressure tend to be broken immediately after activation of the initiator. In a low-temperature atmosphere in which the combustion inner pressure is lower than at normal temperature, this method can reduce the open area of the gas discharge ports as described above to prevent a reduction in the combustion inner pressure at the initial stage of gas generator operation. (As the combustion of the gas generating agent proceeds further, the combustion inner pressure increases, rupturing the seal tape that covers all of the nozzles.) Therefore, this invention prevents the combustion internal pressure from changing in a low-to-high atmosphere temperature range and thus can decrease a difference of the maximum gas generator output in a wide ambient temperature range. This in turn realizes a gas generator that has an operation performance with the S-shaped tank output curve in which the tank output measured at $0.25 \times T$ milliseconds is in a range from $0.07 \times P$ (kPa) to $0.25 \times P$ (kPa) at any environment temperature (atmosphere temperature) at which the gas generator is operated. Further, if gas discharge ports have three different sizes, it is possible to prevent the combustion internal pressure produced when the gas generator is activated in a high-temperature atmosphere from becoming high because of the principle described above and therefore prevent the inflator from producing a strong gas output. In this way, by increasing the number of sizes of the discharge ports, the combustion internal pressure can be adjusted precisely to produce the S-shaped tank output curve with a decreased difference of combustion performance in any atmosphere temperature range.

It is therefore possible to obtain a desired airbag that is not affected by the ambient temperature in the event of an accident requiring the actual operation of the airbag and that will not cause apparent injury to a passenger regardless of his or her posture.

While the above embodiment adopts two sizes of the nozzle diameter, it is possible to use three sizes. In this case, for two sizes of nozzles existing adjacent to each other, an appropriate diameter ratio between the larger port and the smaller port is 4/1 to 1.1/1 as in the above case and also an opening ratio may be in the range of 97/3 to 3/97 as described above.

As described in the above embodiment, the airbag gas generator of this invention includes in the housing with gas discharge ports an ignition means triggered by impacts and a gas generating agent ignited and burned by the ignition means to produce a combustion gas, and also includes, as required, a filter means in the housing that cools the combustion gas and/or arrests combustion residue.

The housing with these gas discharge ports can be formed by casting, forging or pressing and preferably formed by welding together a diffuser shell having gas discharge ports and a closure shell having an ignition means accommodating opening. These shells can be joined together by a variety of welding methods, such as electron beam welding, laser welding, TIG arc welding, and projection welding. When the diffuser shell and the closure shell are formed by pressing various kinds of steel plates such as stainless steel plates, the manufacture of these shell becomes easy and less costly. Further, forming the shells in simple shapes, such as cylinder, facilitates the press work. As to the material of the diffuser shell and the closure shell, a stainless steel plate is preferred but a nickel-plated steel plate may be used instead. It is also possible to install an inner cylinder member in the housing to divide the space in the housing into two or more chambers and then install appropriate members in these chambers.

The impact-triggered ignition means is preferably of an electric ignition type that is activated by an electric signal transmitted from an impact sensor that has detected impacts. This electric type ignition means includes an electric sensor that detects an impact by an electric mechanism, an igniter triggered by an electric signal transmitted from the electric sensor that has detected the impact, and a transfer charge ignited and burned by the igniter operation. The electric sensor may, for example, be a semiconductor acceleration sensor, which has four bridge-connected semiconductor strain gauges on a beam of silicon substrate that deflects upon receiving acceleration. When acceleration is applied, the beam deflects creating strains on the surface, which in turn changes resistance of the semiconductor gauges to produce a voltage signal proportional to the acceleration. The electric type ignition means may also include a control unit having an ignition decision circuit. In this case, a signal from the semiconductor acceleration sensor is sent to the ignition decision circuit and when the impact signal exceeds a predetermined level, the control unit starts a sequence of calculations. When the result of the calculations exceeds a predetermined value, the control unit outputs a trigger signal to the gas generator.

The filter means that is installed in the housing as required has a function of removing the combustion residue, which is produced as a result of combustion of the gas generating agent, and/or cooling the combustion gas. When a gas generating agent that does not produce residue is used, this filter means can be omitted. This filter means is in many cases almost cylindrical and arranged on the outside of an area where the gas generating agent is installed. Such a filter means may be a filter conventionally used to clean a generated gas and/or a coolant to cool the generated gas, or a laminated wire mesh filter that is formed by rolling wire meshes of an appropriate material into an annular laminated body and compressing it. In more concrete terms, the laminated wire mesh filter can be made by forming a plain-woven stainless steel wire mesh into a cylindrical shape, repeatedly folding one end portion of this cylindrical body outwardly to form an annular laminated body, and compressing this laminated body in a mold, or by forming a plain-woven stainless steel wire mesh into a cylindrical shape, pressing this cylindrical body in a radial direction to form a plate body, rolling the plate body into a multiple layer laminated cylindrical body, and compressing it in a mold. The materials for the wire meshes include such stainless steels as SUS304, SUS310S, and SUS316 (JIS Standard). SUS304 (18Cr-8Ni-0.06C), an austenite stainless steel, exhibits an excellent corrosion resistance. This filter means may also have a two-layer structure in which a layer of laminated wire mesh body is provided on the inner or outer side of the filter means. The inner layer may have a function of protecting the filter means against flames produced by the ignition means and ejected toward the filter means and also against the combustion gas from the gas generating agent ignited and burned by the flames from the ignition means. The outer layer can work as a swell suppressing means to block the filter means from swelling due to the gas pressure produced by the activation of the gas generator and thereby prevent the filter means from closing the space between the filter means and the housing circumferential wall. The function of keeping the filter means from swelling can also be realized by supporting the outer circumference of the filter means with the outer layer constructed of a laminated wire mesh body, a porous cylindrical body or an annular belt body.

The gas generating agent in the present invention preferably use a non-azide gas generating agent, which preferably comprises a nitrogen-containing compound, oxidizing agent, slag-forming agent and a binder. The following slag-forming agent can be used as required.

The nitrogen-containing compound used in the present invention may be selected from a group consisting of triazole derivatives, tetrazole derivatives, guanidine derivatives, azodicarbonamide derivatives and hydrazine derivatives, and mixtures of two or more of these compounds. Specific examples of the nitrogen-containing compound may include 5-oxo-1, 2, 4-triazole, tetrazole, 5-aminotetrazole, 5, 5'-bi-1H-tetrazole, guanidine, nitroguanidine, cyanoguanidine, triaminoguanidine nitrate, guanidine nitrate, guanidine carbonate, biuret, azodicarbonamide, carbohydrazide, complex of carbohydrazide nitrate, dihydrazide oxalate, complex of hydrazine nitrate and others.

Of these nitrogen-containing compounds, one kind or two or more kinds selected from the group consisting of tetrazole derivatives and guanidine derivatives is/are preferably used, and nitroguanidine, cyanoguanidine and 5-aminotetrazole are particularly preferably used. The nitroguanidine having the least number of carbons in one molecule is most preferably used. Although either of low-specific-density nitroguanidine in the form of needlelike crystals and high-specific-density nitroguanidine in the form of bulk-like crystals may be used as the nitroguanidine, the high-specific-density nitroguanidine is more preferably used in view of the safety and ease-of-handling during manufacture of the pellets in the presence of a small amount of water. The content of the nitrogen-containing compound in the gas generating agent according to this invention is preferably in the range of 25–56% by weight, or more preferably 30–40% by weight, depending on the number of carbon elements, hydrogen elements and other oxidized elements in its molecular formula.

Although the absolute value of the content of the nitrogen-containing compound differs depending on the type of the oxidizing agent in the gas generating agent, the minor CO concentration in the generated gas increases when the absolute value is larger than the complete oxidation theoretical value, and the minor NOx concentration in the generated gas increases when the absolute value is equal to or smaller than the complete oxidation theoretical value. Accordingly, the content of the nitrogen-containing compound is most preferably controlled in the range that optimally balances these concentrations.

While various compounds may be used as the oxidizing agent in the gas generating agent, the oxidizing agent is preferably selected from at least one kind of nitrates of alkali metal or alkali earth metal, which contain cations. Although oxidizing agents other than nitrates, namely, nitrites and perchlorates that are often used in the field of gas generators, may be used, the nitrate is preferred since the number of oxygen elements in one molecule of nitrite is smaller than that of nitrate and the use of nitrate results in a reduced production of micro-powder mist easily thrown out of the airbag. The nitrates of alkali metals or alkali earth metals, which contain cations, may include sodium nitrate, potassium nitrate, magnesium nitrate and strontium nitrate. Strontium nitrate is particularly preferred. Although the absolute value of the content of the oxidizing agent in the gas generating agent varies depending on the kind and amount of the gas generating compound used, it is preferably in the range of 40–65% by weight, more preferably 45–60% by weight, in view of the CO and NOx concentrations as described above.

The slag-forming agent in the gas generating compound has the function of converting a liquid form of an oxide of alkali metal and alkali earth metal produced by decomposition of the oxidizing agent in the gas generating compound into a solid form such that the oxide can be retained in the combustion chamber and prevented from being discharged in the form of mist out of the inflator. The optimum slag-forming agent can be selected according to the metal composition. More specifically, the slag-forming agent may be selected from at least natural clays mainly containing aluminosilicate such as acid clay, silica, bentonite and kaolin; artificial clays such as synthetic mica, synthetic kaolinite and synthetic smectite; and talc, one kind of minerals of water-containing magnesium silicate. Of these materials, acid clay and silica are preferred and acid clay is most preferred.

For example, an oxidizing mixture having three components-calcium oxide produced from calcium nitrate, and aluminum oxide and silicon dioxide as major components of the clay-has a viscosity that varies from 3.1 poise to about 1000 poise for the temperature range of 1350–1550° C. depending on the ratio of these oxides in the composition and also has a melting point that varies from 1350° C. to 1450° C. depending on the composition. Utilizing these properties, the slag-forming agent can exhibit its slag-forming capability that suits for the mixing ratio of the gas generating agent. The content of the slag-forming agent in the gas generating agent may vary in the range of 1–20% by weight, more preferably in the range of 3–10% by weight. Too large a content of the slag-forming agent will result in a reduced linear burning rate and a lower gas generating efficiency. Too small a content will result in a poor slag-forming capability.

The binder is an essential component for forming a desired shape of pellets. Any type of binder may be used provided that it exhibits a viscous property in the presence of water or a solvent and that it does not have a significant adverse effect on the burning behaviors. Examples of the binder include polysaccharide derivatives, such as carboxymethyl cellulose metallic salts, hydroxyethyl cellulose, cellulose acetate, cellulose propionate, cellulose acetate butyrate, nitrocellulose and starch. In view of the safety and ease of handling during manufacture, a water-soluble binder is preferred, of which carboxymethyl cellulose metallic salts, particularly sodium salts, are most preferred. The content of the binder in the gas generating agent is preferably in the range of 3–12% by weight, more preferably in the range of 4–12% by weight. As the amount of the binder increases, the breaking strength of pellets increases but the number of carbon elements and hydrogen elements in the composition increases, increasing the concentration of the minor CO gas produced by incomplete combustion of carbon elements, which in turn degrades the quality of the generated gas. This is not desirable. When the content of the binder exceeds 12% by weight, the proportion of the oxidizing agent relative to the binder needs to be increased, which in turn reduces the relative proportion of the gas generating compound, making it difficult to provide a practical gas generating system.

Further, where a sodium salt of carboxymethyl cellulose is used as the binder, it provides a secondary effect during the manufacture of pellets using water. Namely, sodium nitrate, which is produced by transmetallation between sodium salt and nitrate and present in a microscopically (on the order of molecule size) mixed state, reduces the decomposition temperature of the nitrate as the oxidizing agent, particularly that of strontium nitrate normally having a high decomposition temperature, thus improving the combustion performance. The preferred gas generating agent used in the gas generator of this invention comprises:

about 25–56% by weight, preferably 30–40% by weight, of nitroguanidine;

about 40–65% by weight, preferably 45–65% by weight, of oxidizing agent;

about 1–20% by weight, preferably 3–10% by weight, of slag-forming agent; and about 3–12% by weight, preferably 4–12% by weight, of binder.

A more preferred composition is:
(a) about 30–40% by weight of nitroguanidine;
(b) about 40–65% by weight of strontium nitrate;
(c) about 3–10% by weight of acid clay or silica; and
(d) about 4–12% by weight of sodium salt of carboxymethyl cellulose.

The above-mentioned gas generating agent is preferably formed into holed pellets of a single-hole cylinder or porous cylinder. If the hole of the pellet has an inner diameter d of 0.2–1.5 mm and a length L, then the value of L/d should preferably be 3.0 or higher. This is because the L/d value controls the ratio of the initially ignited inner surface area to the entire inner surface area of the inner diameter portion of the pellet when the holed pellets are ignited by thermal energy of an ignition system. The part of the pellet that was initially not ignited immediately catches fire from the heat generated by the ignited part. Thus there is no time lag in reaching the maximum pressure and only the initial ignition stage can be controlled. In this respect, this technology should be recognized as basically different from the so-called depowering technology which controls the initial stage by slightly reducing the entire output of the generated gas. Hence, the gas generating agent in the form of holed pellets shaped like a single-hole cylinder or a porous cylinder may have any desired shape of hole, such as a single hole or an aggregate of small single holes, as long as the above control requirement can be met. From the standpoint of the molding cost, however, a single-hole shape is preferred. The inner diameter d of the hole ranges from 0.2 mm to 1.5 mm and is preferably 0.4–1.0 mm. When the value of d is less than 0.2 mm, the area of the inner surface of the holed pellets initially ignited by the thermal energy of the ignition system is not sufficient, producing an unsatisfactory result. When the d value exceeds 1.5 mm, the thermal energy reaches the whole inner surface of the holed pellets, initially igniting too large an area, with the result that a desired output of generated gas cannot be produced. The value of L/d of the holed pellets is 3.0 or higher. Too large a length. L reduces the efficiency of filling the pellets in the gas generating container below a desired level and therefore the length L should be determined according to the size of the container. The preferred value of L/d is 3.0–10.0. When the value of L/d is less than 3.0, the gas generation behavior cannot be controlled. The length L of the holed pellets of this invention, though not limited. to any particular value, should preferably be in the range of 1.5–30 mm. The outer diameter D, though not limited to any particular value either, is preferably in the range of 1.5–5.0 mm, 2.0–5.0 mm or 2.4–5.0 mm in case of a single-hole pellet.

The preferred pellets of the gas generating agent of this invention are made by molding the following compositions into the shape of a single-hole cylinder.
(a) about 25–56% by weight of nitroguanidine;
(b) about 40–65 by weight of oxidizing agent;
(c) about 1–20% by weight of slag-forming agent; and
(d) about 3–12% by weight of binder.

The gas generator of this invention can use appropriate structures and members advantageous for its operation. The structures and members useful in the activation of the gas generator include, for example: a "filter support member" installed between the inner cylinder member, which defines the ignition means accommodating chamber on its inner side, and the filter means for supporting the filter means; a "short path prevention means" enclosing the upper and/or lower end of the inner circumference of the filter means to prevent the generated gas from passing through a clearance between the filter means and the inner surface of the housing; a "cushion member" arranged above and/or below the gas generating agent to prevent displacement of the gas generating agent; a "perforated basket" of almost porous cylindrical shape arranged on the inner side of the filter means to prevent direct contact between the gas generating agent and the filter means and thereby protect the filter means against flames of the burning gas generating agent; and a "space" secured between the outer surface of the filter means and the sidewall inner surface of the housing to function as a gas passage.

The airbag gas generator described above is accommodated in a module case together with an airbag (bag body), which inflates by receiving a gas generated by the gas generator, to form an airbag apparatus.

This airbag apparatus activates the gas generator in response to the impact sensor detecting impacts and discharges a combustion gas from the gas discharge ports of the housing. The combustion gas flows into the airbag, which is inflated to break the module cover thereby forming a shock-absorbing cushion between a hard structure of the vehicle and the passenger.

Figure 17:
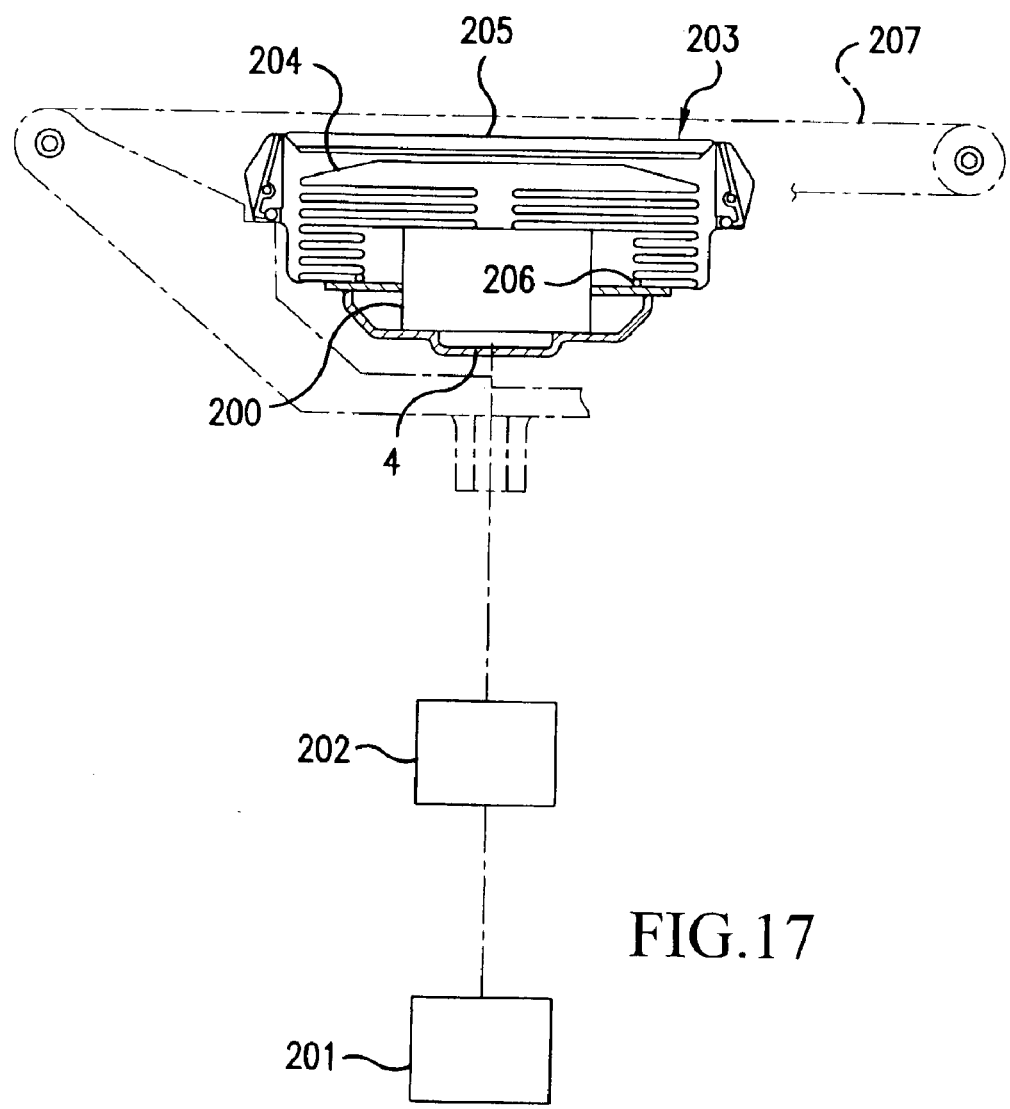
FIG. 17 is a configuration of the airbag apparatus of this invention.

FIG. 17 shows an embodiment of the airbag apparatus of this invention including the gas generator using an electric type ignition means.

This airbag apparatus includes a gas generator 200, an impact sensor 201, a control unit 202, a module case 203, and an airbag 204. The gas generator 200 uses the gas generator explained by referring to FIG. 1 and has its operation performance adjusted so as to apply as small an impact as possible to the passenger at the initial stage of the gas generator operation.

The impact sensor 201 may be, for example, a semiconductor type acceleration sensor. The semiconductor type acceleration sensor has four bridge-connected semiconductor strain gauges attached on a beam of silicon substrate that deflects when subjected to an acceleration. When an acceleration is applied, the beam deflects causing strains on its, surface, which in turn change the resistance of the semiconductor strain gauges to produce a voltage signal proportional to the acceleration.

The control unit 202 has an ignition decision circuit, which is supplied with a signal from the semiconductor type acceleration sensor. When the impact signal from the sensor 201 exceeds a predetermined level, the control unit 202 starts calculation. When the result of the calculation exceeds a predetermined value, the control unit outputs a trigger signal to the igniter 4 of the gas generator 200.

The module case 203 is formed of, for example, a polyurethane, and includes a module cover 205. The module case 203 accommodates the airbag 204 and the gas generator 200 to form a pad module. This pad module, when mounted on the driver's seat side of a vehicle, is normally installed in a steering wheel 207.

The airbag 204 is made of nylon (nylon 66, for example) or polyester. With its bag inlet 206 enclosing the gas discharge ports of the gas generator, the airbag is folded and secured to the flange portion of the gas generator.

When the semiconductor type impact sensor 201 detects an impact at time of collision of an automobile, the impact signal is sent to the control unit 202 which, when the impact signal from the sensor exceeds a predetermined level, starts a calculation. If the result of the calculation exceeds a predetermined value, the control unit outputs a trigger signal to the igniter 4 of the gas generator 200. The igniter 4 is then activated to ignite and burn the gas generating agent to produce a gas, which is ejected into the airbag 204, causing the airbag to inflate breaking the module cover 205 thereby forming a shock-absorbing cushion between the steering wheel 207 and the passenger.

What is claimed is:

1. An airbag gas generator, comprising:
    a housing having gas discharge ports that are open prior to activation of the gas generator;
    ignition means provided within said housing for generating a combustion product upon activation thereof, said ignition means including an igniter having an output pressure of 700 psi or higher at 20° C. atmosphere when said igniter is burned within a hermetically closed cylinder having a volume of 10 cc; and
    a seal tape that closes the gas discharge ports for preventing fluid communication between an inside and outside of said housing before activation of said gas generator, said seal tape being ruptured by an inner pressure increased as a result of the generation of the combustion product.

2. An airbag gas generator according to claim 1, wherein a combustion chamber in which to burn the gas generating agent is provided in the housing of the gas generator, and the volume of the combustion chamber is expanded when the gas generator is activated or the gas generating agent is burned.

3. An airbag gas generator according to claim 1, wherein a combustion chamber in which to burn the gas generating agent is provided in the housing of the gas generator, a space of a predetermined volume containing no gas generating agent is formed in the combustion chamber, and a combustion volume of the gas generating agent is expanded into the space immediately after the gas generating agent is ignited.

4. An airbag gas generator according to claim 3, wherein the space is formed by dividing the combustion chamber by a partition member.

5. An airbag gas generator according to claim 1, wherein the ignition means includes a transfer charge for igniting and burning the gas generating agent, and said housing includes,
    a first passage through which a combustion gas produced by the combustion of the transfer charge passes without passing through a gas generating agent accommodating portion, and
    a second passage through which a combustion gas of the gas generating agent burned by the combustion gas of the transfer charge passes.

6. An airbag gas generator according to claim 5, wherein the first passage is a bypass to release the combustion gas of the transfer charge directly out of the housing, and the combustion gas of the transfer charge passing through the first passage is discharged out of the housing earlier than the combustion gas of the gas generating agent discharged through the second passage.

7. An airbag gas generator according to claim 1, further comprising:
    filter means for filtering the combustion product,
    wherein the combustion product produced by the operation of the ignition means is discharged directly through the filter means, and nothing except the filter means exists in a passage of the gas.

8. An airbag gas generator according to claim 1, wherein a timing at which the seal tape is ruptured to release the gas is within 3 milliseconds of the application of an ignition current when the atmosphere is at 20° C.

9. An airbag gas generator according to claim 8, wherein the ignition means includes an igniter and the igniter has an output of 700 psi or higher in a normal temperature (20° C.)

atmosphere when the igniter is burned inside a hermetically closed cylinder with a volume of 10 cc.

10. An airbag gas generator according to claim 8, wherein a pressure at which the seal tape is ruptured is less than 100 kg/cm².

11. The airbag gas generator according to claim 1, wherein the igniter has the output pressure of 1000–1800 psi.

12. The airbag gas generator according to claim 1, wherein an inner diameter of the gas discharge ports is in a range of 1.5 to 10 mm and said seal tape includes a seal layer of 20–200 μm thick and a bonding layer or adhesive layer of 5–100 μm thick.

13. The airbag gas generator according to claim 1, wherein a peak of a combustion internal pressure generated by a first combustion gas generated due to combustion of said gas generating agent in the housing appears 10–20 milliseconds after an ignition current is applied to said ignition means.

14. The airbag gas generator according to claim 13, wherein the peak of the combustion internal pressure appears 12–16 milliseconds after the ignition current is applied.

15. The airbag gas generator according to claim 14, wherein the peak of the combustion internal pressure appears 13–15 milliseconds after the ignition current is applied.

16. The airbag gas generator according to claim 1, wherein the gas discharge ports includes at least a first gas discharge port having a first inner diameter and a second gas discharge port having a second inner diameter, smaller than the first inner diameter, a diameter ratio of the first gas discharge port to the second gas discharge port ranges from 4/1 to 1.1/1 and an opening area ratio of the first gas discharge port to the second gas discharge port ranges from 97/3 to 3/97.

17. An airbag gas generator according to claim 16, wherein the gas discharge ports includes only a plurality of first gas discharge ports and a plurality of second gas discharge ports.

18. A motor vehicle including an airbag gas generator, an airbag inflated by receiving a gas produced by the gas generator, and a module case to accommodate the airbag, all installed in a steering wheel in front of the driver seat, wherein the airbag gas generator is the one claimed in claim 1.

19. The gas generator of claim 1, wherein said seal tape is ruptured within 3 milliseconds after an ignition current is applied to said ignition means at 20° C.

20. The gas generator of claim 1, wherein said seal tape is ruptured at a pressure less than 100 kg/cm².

21. The airbag gas generator according to claim 20, wherein the seal tape ruptures at a pressure of 70–40 kg/cm².

22. The gas generator of claim 1, wherein, in a 60 liter tank combustion test, in which said gas generator is placed and activated in a 60 liter sealed tank, and said gas generator generates a maximum tank pressure of P (kPa) at T milliseconds after an initial rise in a tank pressure due to combustion of said gas generating agent, a tank pressure at 0.25×T milliseconds after the initial rise in the tank pressure is lower than 0.25×P (kPa).

23. The airbag gas generator according to claim 22, wherein a tank pressure at 0.80×T milliseconds after the initial rise in the tank pressure is higher than 0.70×P (kPa).

24. The airbag gas generator according to claim 22, wherein a tank pressure 13 milliseconds after an application of ignition current to said ignition means is 11 kPa to 45 kPa.

25. The airbag gas generator according to claim 22, wherein a tank pressure 0.25×T milliseconds after an application of ignition current to said ignition means is between 0.07×P (kPa) and 0.25×P (kPa).

26. The airbag gas generator of claim 1, wherein the combustion product is at least one of a second combustion gas and a heat.

27. The gas generator of claim 26, further comprising:
an ignition means accommodating chamber provided within said housing for accommodating said ignition means therein;
a combustion chamber provided within said housing for accommodating and burning said gas generating agent therein; and
a gas passage formed within said housing to direct the second combustion gas toward the gas discharge ports without passing through said combustion chamber.

28. An airbag gas generator of claim further comprising:
an inner cylindrical member provided within said housing for forming an ignition means accommodating chamber therein, and defining a combustion chamber in an outer side thereof to burn said gas generating agent for generating a first combustion gas generated due to combustion of said gas generating agent,
wherein said inner cylindrical member includes communication ports through which the second combustion gas is discharged toward the gas discharge ports to rupture the seal tape.

29. The airbag gas generator of claim 26, wherein said ignition means includes an igniter having an output pressure of 700 psi or higher at 20° C. atmosphere when said igniter is burned within a hermetically closed cylinder having a volume of 10 cc,
wherein said igniter generates said at least one of the second combustion gas and the heat such that said seal tape is ruptured by the pressure increased by said at least one of the second combustion gas and the heat.

30. An airbag gas generator, comprising:
single ignition means activated by an impact; and
a gas generating agent ignited and burned by the ignition means to produce a combustion gas, the ignition means and the gas generating agent being accommodated in a housing with gas discharge ports,
wherein an operation performance of the gas generator is set such that a tank pressure measured at 0.25×T milliseconds is 0.25×P (kPa) or less where a desired tank maximum pressure in a tank combustion test is P (kPa) and a period of time from the start of rising of the tank pressure to the time when the maximum pressure P (kPa) is reached is T milliseconds and that the housing is formed with two or more kinds of gas discharge ports having different inner diameter and/or opening area.

31. An airbag apparatus, comprising:
an airbag gas generator, including,
a housing having gas discharge ports that are open prior to activation of the gas generator,
ignition means provided within said housing for generating a combustion product upon activation thereof, said ignition means including an igniter having an output pressure of 700 psi or higher at 20° C. atmosphere when said igniter is burned within a hermetically closed cylinder having a volume of 10 cc, and
a seal tape that closes the gas discharge ports to prevent fluid communication between an inside and outside of said housing before activation of said gas generator, said seal tape being ruptured by an inner pressure increased as a result of the generation of the combustion product;

an impact sensor that detects an impact and activates the gas generator;

an airbag inflated by receiving the first combustion gas generated by the gas generator; and a module case that accommodates the airbag.

32. A method of rupturing a seal tape for closing gas discharge ports, that are open prior to activation of the gas generator, formed in an airbag gas generator housing, in which a gas generating agent generating a combustion gas and ignition means for generating a combustion product, are provided, comprising:

generating the combustion product by activating the ignition means that includes an igniter having an output pressure of 700 psi or higher at 20° C. atmosphere when said igniter is burned within a hermetically closed cylinder having a volume of 10 cc; and rupturing said seal tape by increasing an inner pressure within said housing by the generated combustion product.

33. An airbag gas generator, comprising:

a housing including a top plate provided with a first gas discharge port and a circumferential wall provided with a second gas discharge port, the housing containing a gas generating agent therein;

ignition means provided within said housing such that said ignition means is positioned adjacent to the first gas discharge port for generating a combustion product; and a seal tape that closes the first gas discharge port and the second gas discharge port to prevent fluid-communication between an inside and outside of said housing before activation of said gas generator, said seal tape being ruptured by an increase in a pressure within said housing as a result of the generation of the combustion product, wherein the combustion product ruptures the seal tape and is discharged through the first gas discharge port without igniting and burning the gas generating agent.

34. An airbag apparatus, comprising:

an airbag gas generator, including, a housing including a top plate provided with a first gas discharge port and a circumferential wall provided with a second gas discharge port that is open prior to activation of the gas generator, the housing containing a gas generating agent therein, ignition means provided within said housing such that said ignition means is positioned adjacent to the first gas discharge port for generating a combustion product, a seal tape that closes the first gas discharge port and the second gas discharge port to prevent a fluid-communication between an inside and outside of said housing before activation of said gas generator, said seal tape being ruptured by an increase in a pressure within said housing as a result of the generation of the combustion product;

an impact sensor that detects an impact and activates the gas generator;

an airbag inflated by receiving the combustion product and combustion gas; and a module case that accommodates the airbag, wherein the gas discharge port is formed at a portion of said housing adjacent said ignition means, and wherein the combustion product ruptures the seal tape and is discharged through the first gas discharge port without igniting and burning the gas generating agent.

35. An air bag gas generator, comprising:

a housing having gas discharge ports;

ignition means provided within said housing for generating a combustion product upon activation thereof;

an ignition means accommodating chamber provided within said housing for accommodating said ignition means therein and including a port for discharging the combustion product therefrom;

a combustion chamber provided within said housing for accommodating and burning gas generating agent therein;

a seal tape that closes the gas discharge ports to prevent fluid communication between inside and outside of said housing before activating of said gas generator; and gas passage formed in an upper portion of said housing and separated from said combustion chamber for passing at least a portion of the combustion product therethrough toward the gas discharge ports, such that the combustion product that passes through the gas passage ruptures the seal tape and is discharged through the gas discharge ports without igniting and burning the gas generating agent.

36. An air bag gas generator, comprising:

a housing having a gas discharge port formed in a circumferential wall thereof;

a combustion chamber provided inside said housing for accommodating gas generating agent therein;

ignition means provided inside said housing for generating a combustion product for igniting the gas generating agent;

an ignition means accommodating chamber provided inside said housing for accommodating said ignition means therein, the ignition means accommodating chamber including a port for discharging the combustion product therefrom, the port being formed in a circumferential portion of the ignition means accommodating chamber such that an axis of the gas discharge port and an axis of the port are substantially on the same plane and perpendicular to a center axis of said housing;

a seal tape that closes the gas discharge port to prevent fluid communication between inside and outside of said housing before activation of said gas generator, said seal tape being adapted to rupture by receiving pressure of the combustion product; and a retainer provided within said combustion chamber for supporting a cylindrical coolant that is provided within said housing, said retainer including a projecting portion formed therein such that the projecting portion is only in contact with the cylindrical coolant and extending into an inner side of said housing such that an inner end of the projecting portion is located above an imaginary line connecting the port and the gas discharge port, said retainer defining a gas passage that bypasses the combustion chamber such that the combustion product that passes through the passage ruptures the seal tape and is discharged through the gas discharge port without igniting and burning the gas generating agent.

37. An air bag gas generator according to claim 36, wherein an outer circumferential surface of the projecting portion is in contact with an inner surface of the cylindrical coolant.

38. An airbag gas generator, comprising:

a housing having gas discharge ports;

a seal tape that closes the gas discharge ports to prevent fluid communication between an inside and outside of said housing before activation of said gas generator, said seal tape being ruptured as a result of the combustion product directly reaching the seal tape; and ignition means provided inside said housing for generating a combustion product upon activation thereof, at least a portion of the combustion product ruptures the seal tape and discharged thorough the gas discharge ports without igniting and burning a gas generating agent accommodated inside the housing.

* * * * *